(12) United States Patent
Ohnishi et al.

(10) Patent No.: US 8,881,185 B2
(45) Date of Patent: Nov. 4, 2014

(54) ROTARY ELEMENT ASSEMBLY STRUCTURE WITH ROTARY ELEMENT CAPABLE OF ROTATING ABOUT HOLLOW SHAFT

(75) Inventors: Masanori Ohnishi, Osaka (JP); Masahiko Nakamura, Osaka (JP); Hiroyuki Kusu, Osaka (JP); Yasue Chihara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/822,332

(22) PCT Filed: Dec. 9, 2011

(86) PCT No.: PCT/JP2011/006896
§ 371 (c)(1),
(2), (4) Date: Mar. 12, 2013

(87) PCT Pub. No.: WO2013/084272
PCT Pub. Date: Jun. 13, 2013

(65) Prior Publication Data
US 2014/0007144 A1    Jan. 2, 2014

(51) Int. Cl.
*G11B 19/20* (2006.01)
*G11B 25/10* (2006.01)
*G11B 33/12* (2006.01)
*G11B 33/02* (2006.01)
*G11B 17/04* (2006.01)
*F16D 1/08* (2006.01)

(52) U.S. Cl.
CPC ............ *G11B 19/2009* (2013.01); *G11B 25/10* (2013.01); *G11B 33/122* (2013.01); *G11B 33/027* (2013.01); *G11B 17/0405* (2013.01); *F16D 1/08* (2013.01)
USPC .......................................................... 720/647

(58) Field of Classification Search
USPC ................................... 720/647, 715; 403/345
See application file for complete search history.

(56) References Cited

U.S. PATENT DOCUMENTS 4,403,317 A * 9/1983 Suzuki et al. .................. 720/603
4,447,900 A * 5/1984 Schatteman et al. .......... 369/200

(Continued)

FOREIGN PATENT DOCUMENTS

JP     2-118956 A     5/1990
JP    11-270527 A    10/1999

(Continued)

OTHER PUBLICATIONS

International Search Report for corresponding International Application No. PCT/JP2011/006896 mailed Mar. 6, 2012.
Form PCT/ISA/237 for corresponding International Application No. PCT/JP2011/006896 mailed Mar. 6, 2012.
International Preliminary Report on Patentability (English translation) for corresponding patent application no. PCT/JP2011/006896 dated Jun. 19, 2014.

*Primary Examiner* — Angel Castro
(74) *Attorney, Agent, or Firm* — Renner, Otto, Boisselle & Sklar, LLP

(57) ABSTRACT

A rotary element assembly structure in which a rotary element 53 is assembled to a tip side of a hollow shaft B1 provided upright on a pedestal 60. A cylindrical portion 53*c* for fitting with the hollow shaft is provided to a rotation center portion of the rotary element. In the cylindrical portion, a hook strut portion 53*s* that has a hook portion 53*f* overhanging in the radial direction at its tip side and that extends substantially in the fitting direction is arranged. A base end portion of the hook strut portion and a base end portion of the cylindrical portion are coupled with each other by a resin-made thin plate portion 53*p*. A small diameter portion B1*s* which is smaller in diameter than a hollow portion B1*d* of the hollow shaft is provided on the tip side of the hollow shaft. The radius of the overhang tip portion of the hook portion is set to be greater than the radius of the small diameter portion of the hollow shaft, and to be smaller than the radius of the hollow portion. By fitting the hollow shaft with the cylindrical portion of the rotary element, the hook portion on the tip side of the hook strut portion is pushed into the hollow portion via the small diameter portion on the tip side of the hollow shaft. Thereby, the hook portion engages with a stepped portion formed by the hollow portion and the small diameter portion.

15 Claims, 31 Drawing Sheets

(56) References Cited

U.S. PATENT DOCUMENTS

| | | | |
|---|---|---|---|
| 4,744,072 A * | 5/1988 | Tamaki et al. | 720/612 |
| 5,355,357 A * | 10/1994 | Yamamori et al. | 720/646 |
| 5,805,554 A * | 9/1998 | Suzuki et al. | 720/612 |
| 6,125,712 A | 10/2000 | Kaburagi et al. | |
| 6,212,147 B1 * | 4/2001 | Ishihara | 720/612 |
| 6,804,821 B1 * | 10/2004 | Reed | 720/622 |
| 6,817,021 B1 * | 11/2004 | Miyasaka et al. | 720/603 |
| 6,862,739 B1 * | 3/2005 | Hunter et al. | 720/653 |
| 6,952,834 B2 * | 10/2005 | Inatani et al. | 720/696 |
| 7,120,918 B2 * | 10/2006 | Yanase et al. | 720/612 |
| 7,340,755 B2 * | 3/2008 | Sasaki | 720/655 |
| 2008/0046902 A1 | 2/2008 | Tanabe et al. | |

FOREIGN PATENT DOCUMENTS

| | | |
|---|---|---|
| JP | 2002-367347 A | 12/2002 |
| JP | 2003-004032 A | 1/2003 |
| JP | 2004-052869 A | 2/2004 |
| JP | 2006-114204 A | 4/2006 |
| JP | 2007-198489 A | 8/2007 |
| JP | 2009-036359 A | 2/2009 |

* cited by examiner

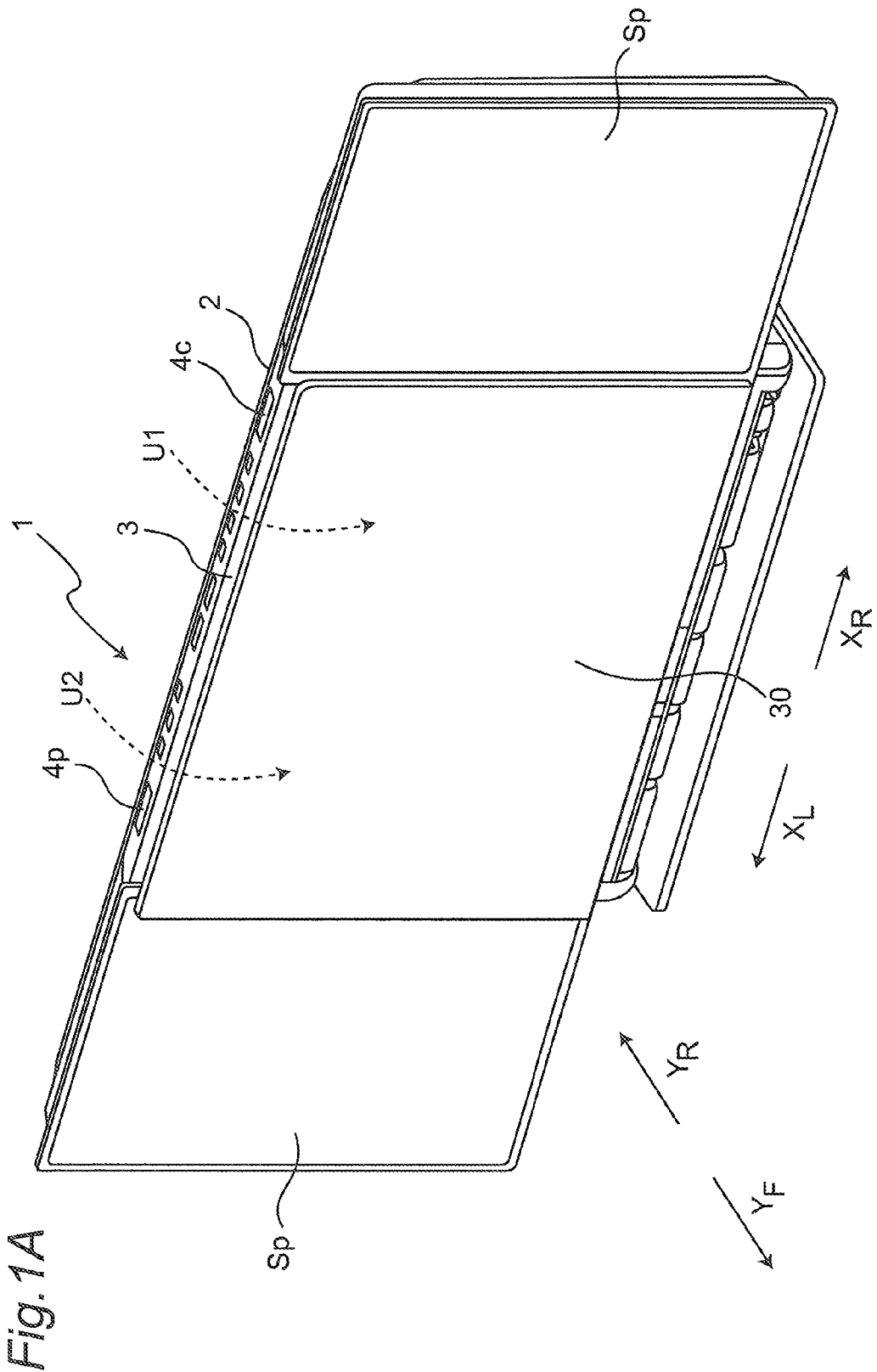

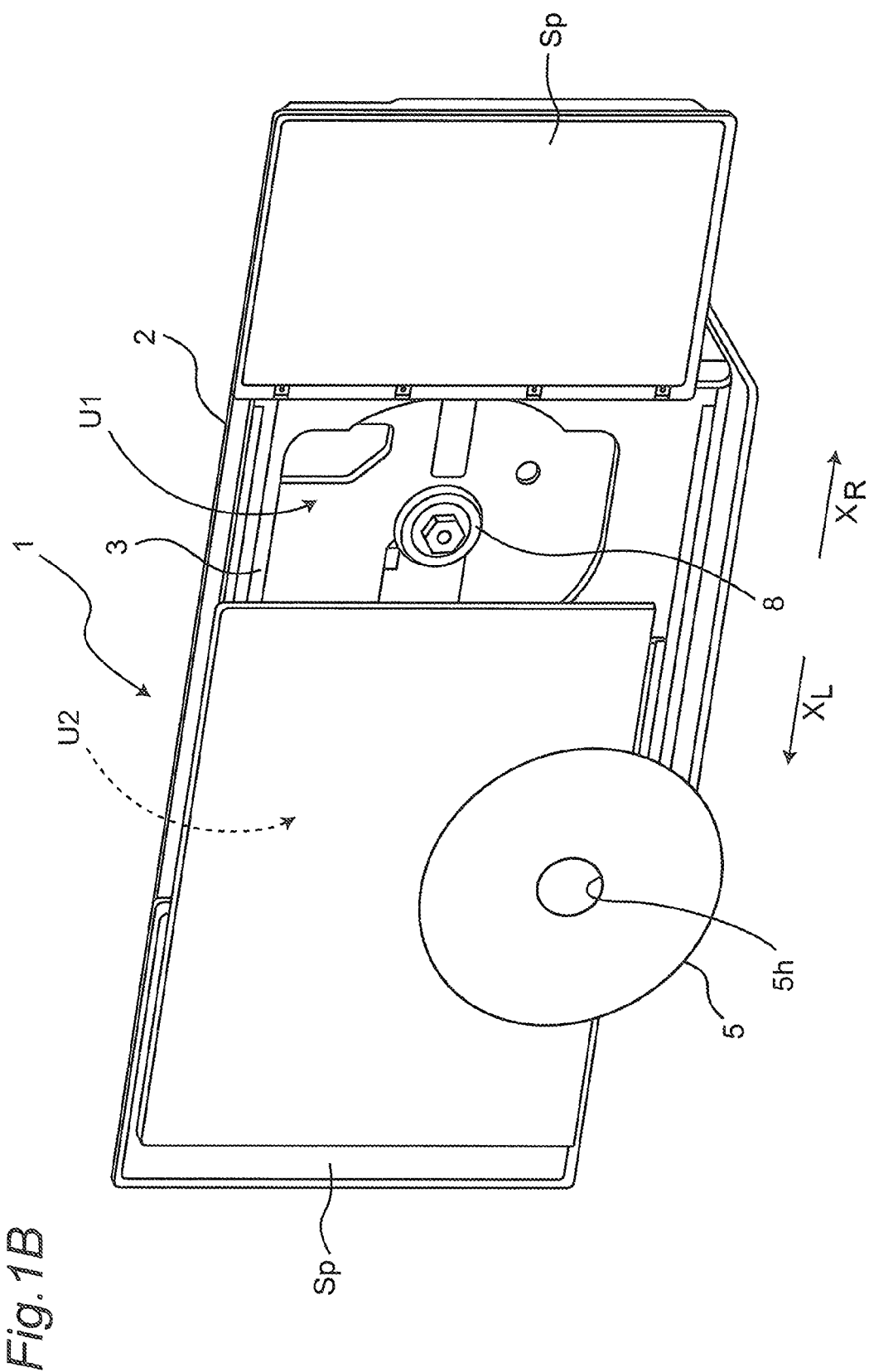

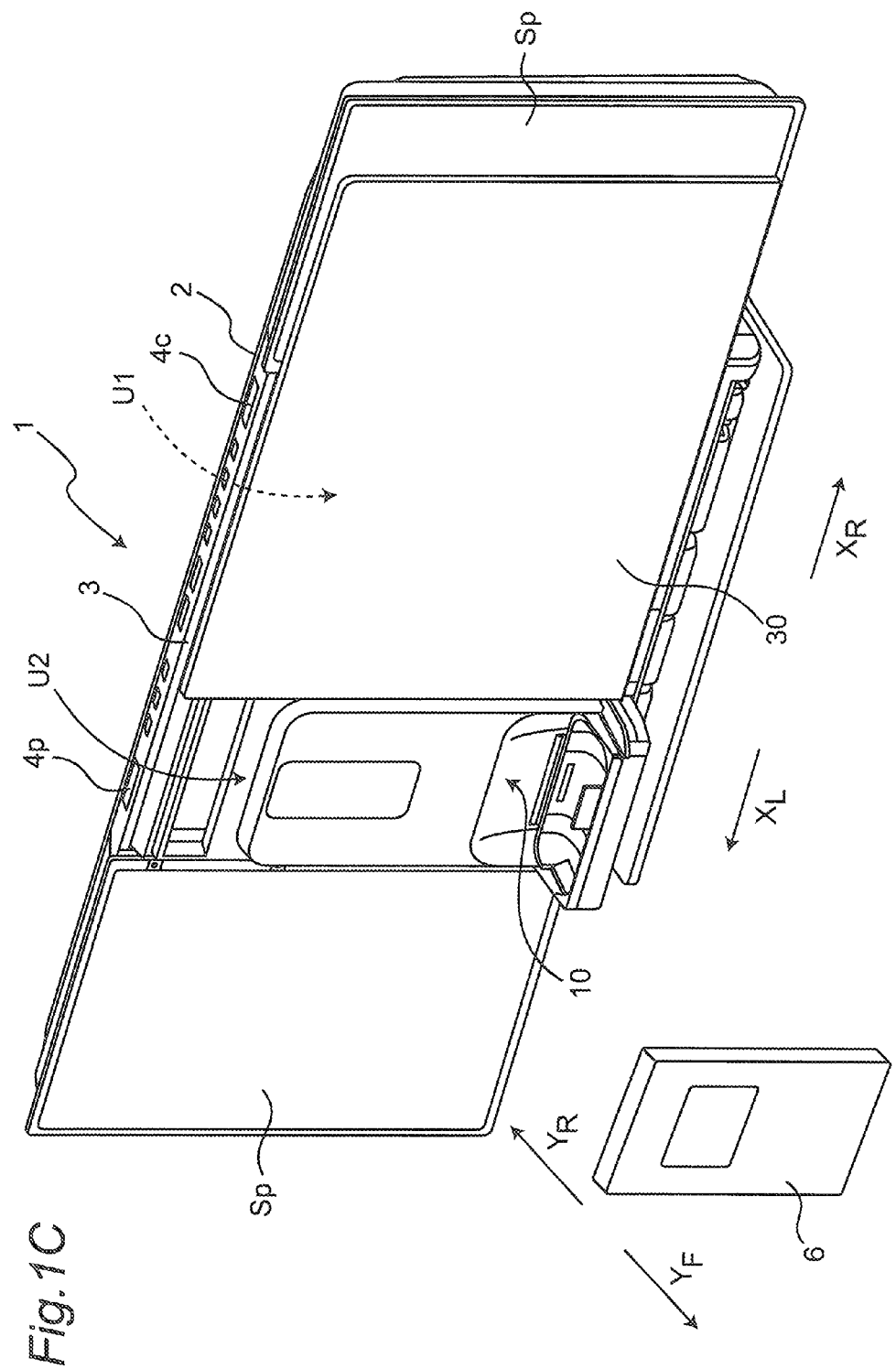

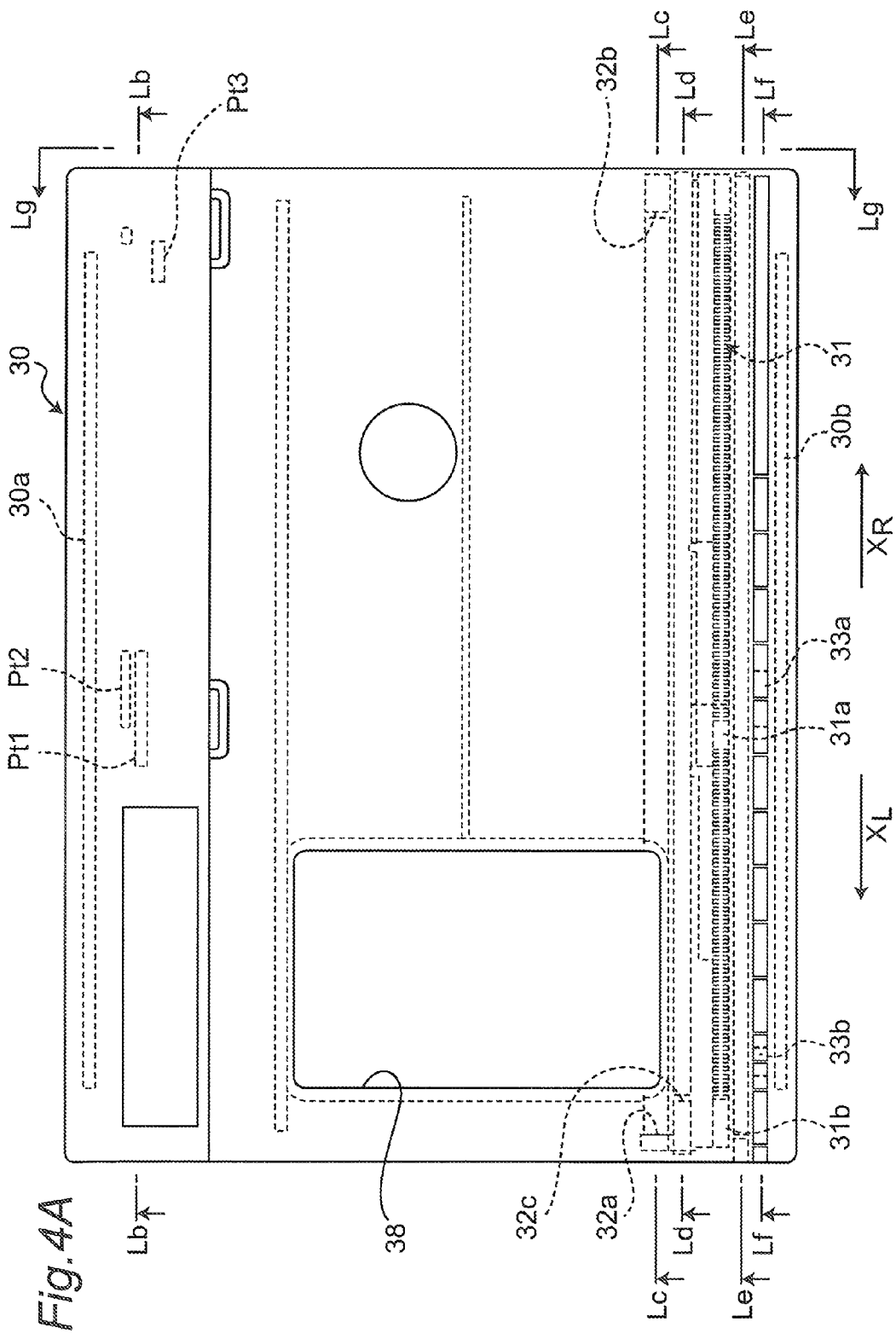

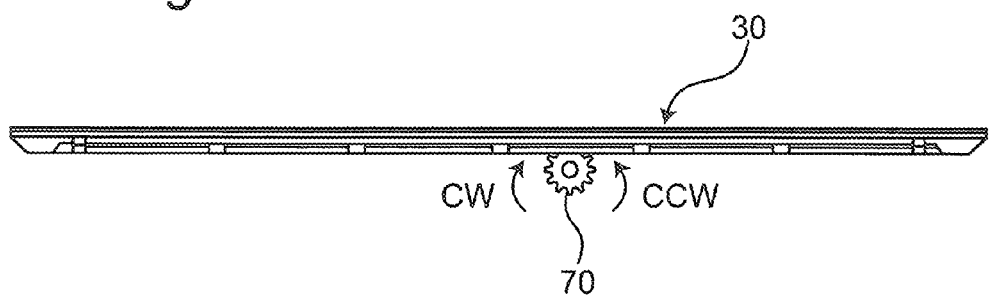
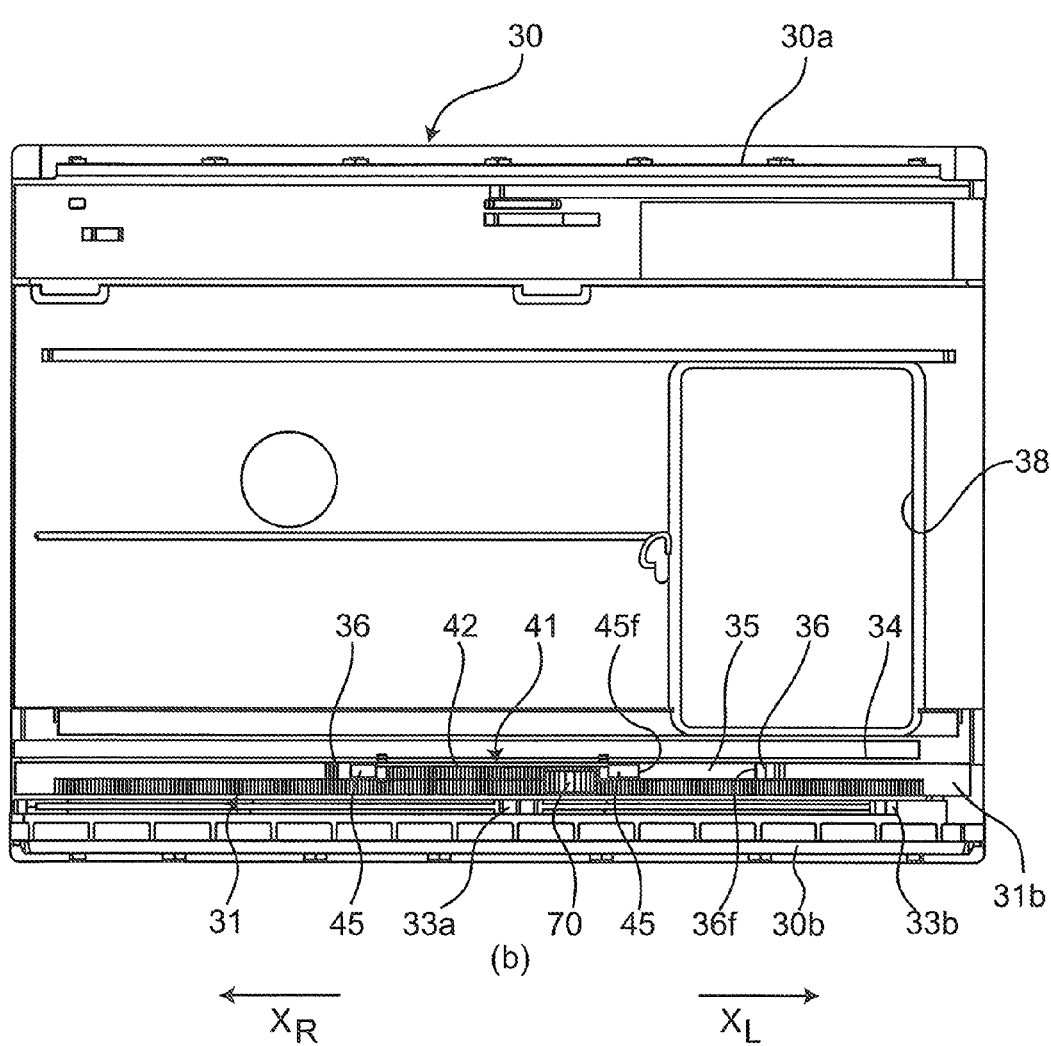

Fig.6B
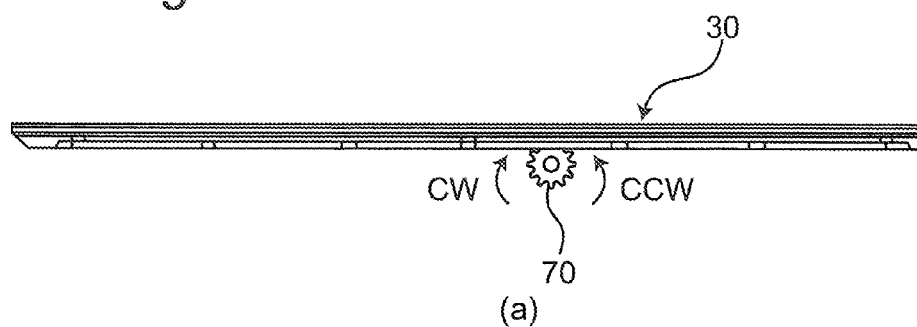
(a)
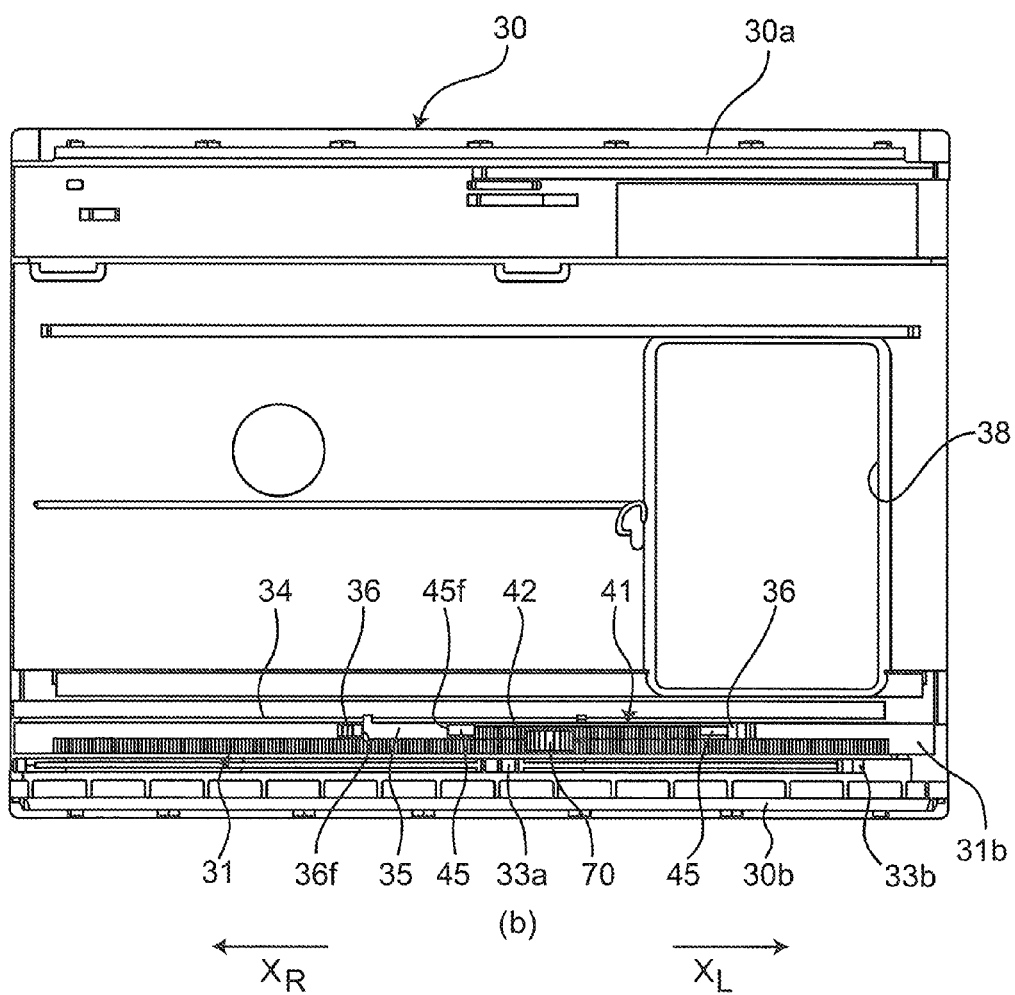
(b)

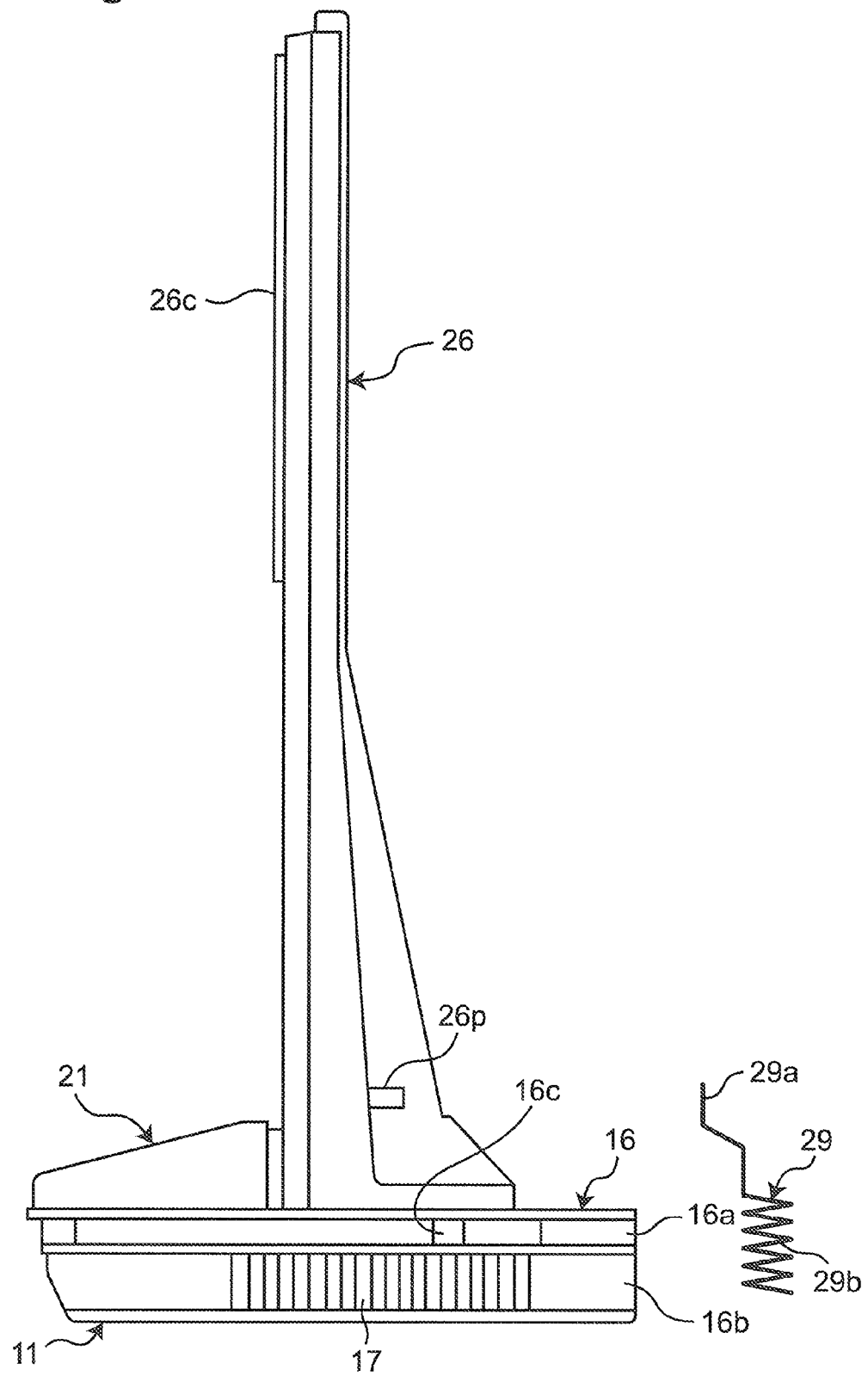

Fig.9H
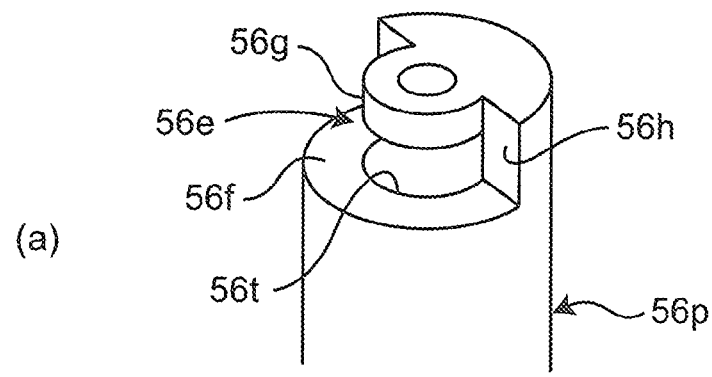
(a)
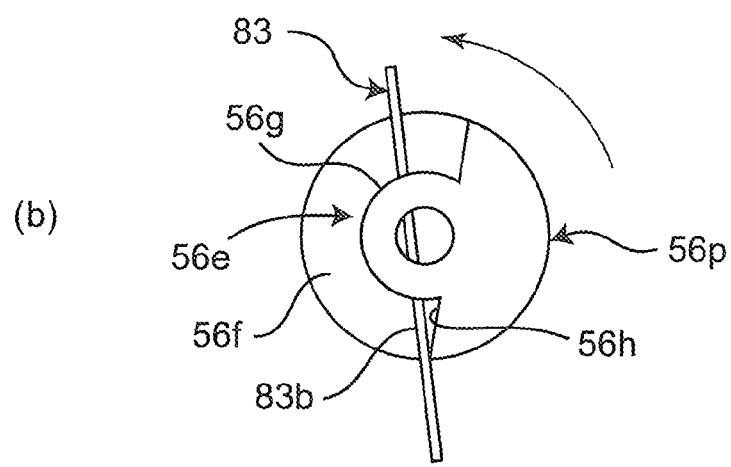
(b)
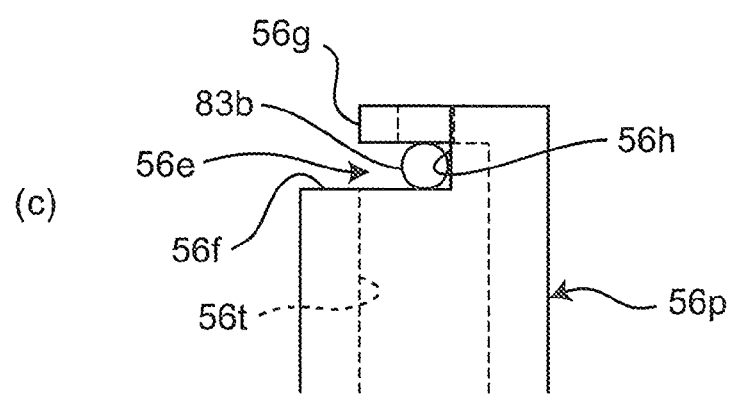
(c)

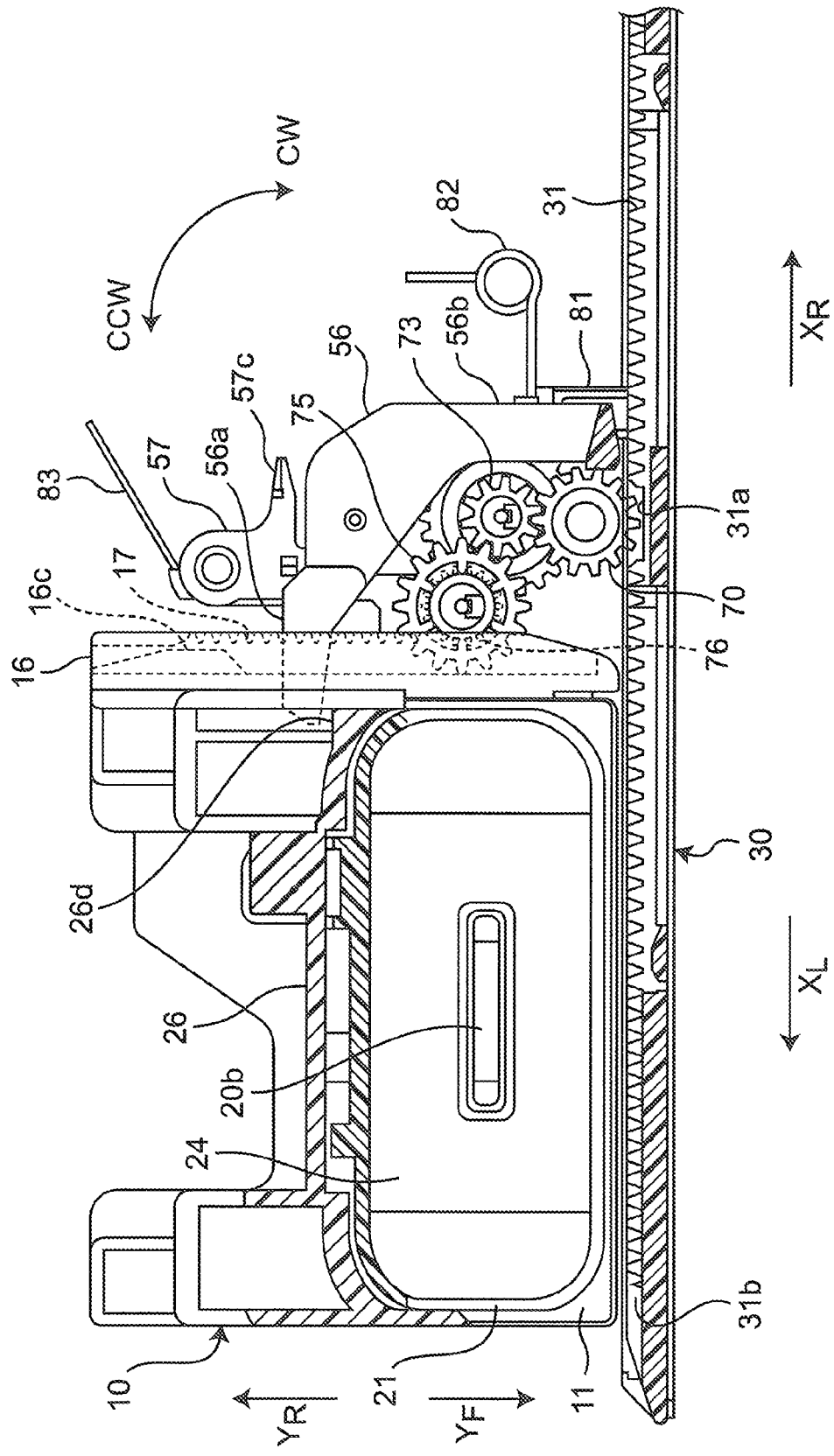

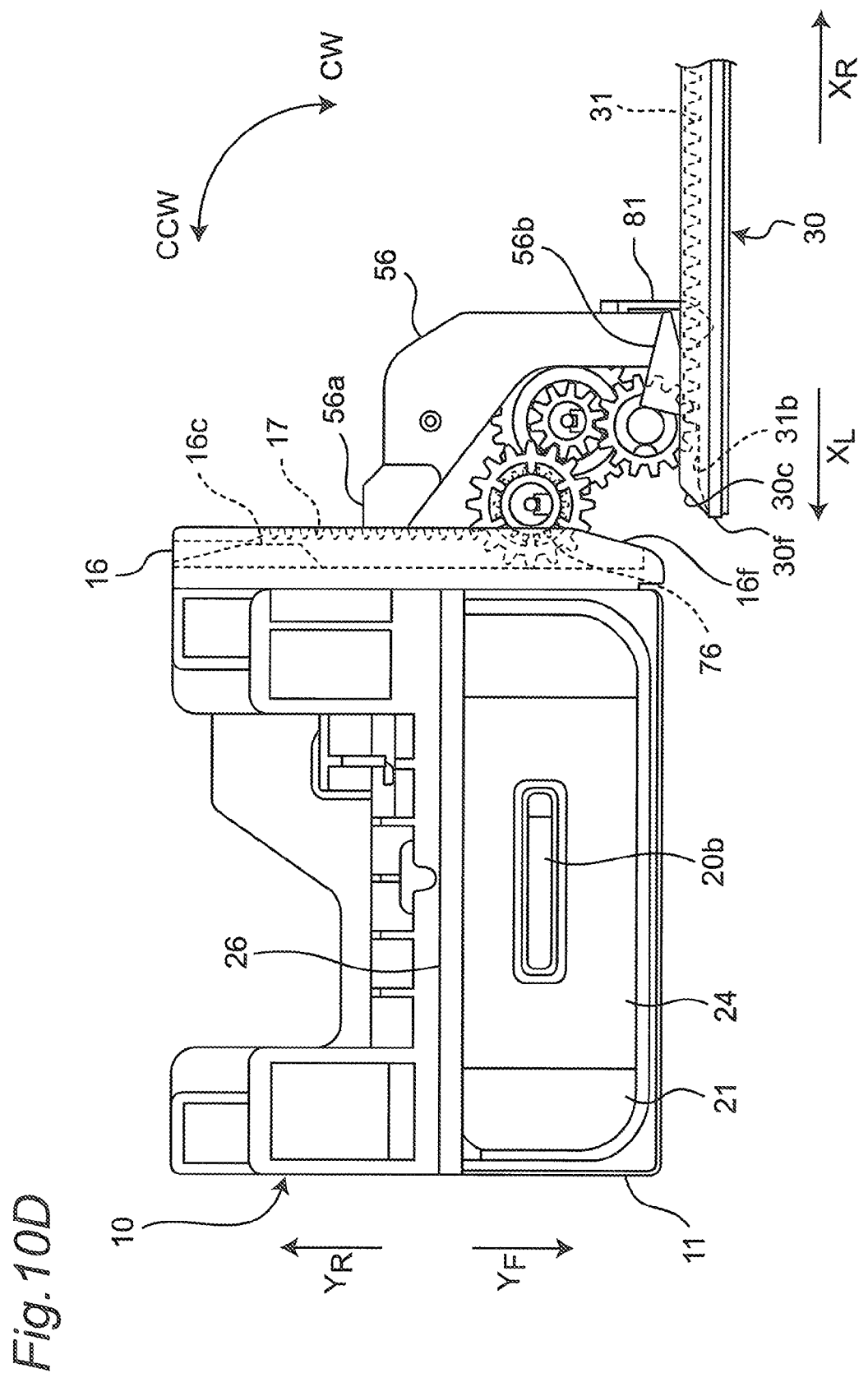

ROTARY ELEMENT ASSEMBLY STRUCTURE WITH ROTARY ELEMENT CAPABLE OF ROTATING ABOUT HOLLOW SHAFT

TECHNICAL FIELD

The present invention relates to a rotary element assembly structure. Further, the present invention relates to a disc apparatus.

BACKGROUND ART

Conventionally, in connection with an assembly product of, for example, an electric device, an electronic device and the like, what is well known is a structure in which, in the case where a rotary element, e.g., a gear or a pulley, is to be rotatably assembled to an assembly pedestal, a hollow shaft is provided to stand upright on a pedestal, and the rotary element is assembled to the tip side of the hollow shaft so as to be rotatable about the hollow shaft. Refer to Patent Literatures 1 or 2, for example.

Further, as to such a structure, in the case where the rotary element is assembled to the tip side of the hollow shaft, the following structure is widely employed: a female screw portion is provided to the tip side of the hollow shaft; a male screw member such as a screw which penetrate through the center portion of the rotary element is screwed and tightened with the female screw portion on the hollow shaft tip side; and in this tightened state, a slight gap is formed between the head portion of the male screw member or a washer and the hollow shaft tip portion. Employing such a structure, it becomes possible to surely prevent the rotary element from coming off from the tip portion of the hollow shaft while rotatably holding the rotary element at the tip portion of the hollow shaft.

PATENT LITERATURES

[Patent Literature 1]: JP 2004-52869 A
[Patent Literature 2]: JP 2009-36359 A

DISCLOSURE OF THE INVENTION

Problems to be Solved by the Invention

However, with the assembly structure in which the rotary element is assembled to the tip side of the hollow shaft using the screw mechanism as described above, it is troublesome to screw the male screw member into the female screw portion on the hollow shaft tip side and tighten the same. Accordingly, it is a great problem in enhancing the workability of the assembly step. Further, since the male screw member is required, it is another problem in achieving a reduction in the number of components. In particular, with an electric device, an electronic device or the like having installed therein many rotary elements such as gears, pulleys and the like, an improvement in the workability of the assembly step and a reduction in the number of components are very important objects to be achieved in view of the productivity of the devices and the costs for the components.

Further, with the assembly structure in which the rotary element is assembled to the tip side of the hollow shaft using the screw mechanism as described above, when the male screw member is screwed into the female screw portion on the tip side of the hollow shaft and tightening torque is applied, the hollow shaft tip side may greatly bulge in the radially outward direction. Alternatively, depending on the condition, crack may occur. In the worst case, the hollow shaft tip side may be broken. In particular, when the hollow shaft is made of resin, such a tendency is prone to become significant. In order to effectively avoid the occurrence of such troubles, it becomes inevitable to take measures, e.g., to set the diameter of the hollow shaft to be significantly great, and increase the thickness of the portion in which the female screw is formed. In particular, with the electric device or the electronic device having installed therein many rotary elements such as gears or pulleys, the problems may disadvantageously influence the design of the whole device.

Meanwhile, in connection with a disc apparatus that records information signals on and/or reproduces recorded information signals from a disc as an information recording medium, what is known is a so-called upright type apparatus, which holds and uses a disc in a state where the disc is tilted by a certain degree from the horizontal direction (e.g., in a substantially vertical state).

With such an upright type disc apparatus, in the case where a disc is to be attached to or removed from a turn table rotatably supporting the disc, the user is required to perform the attaching or removing work carefully so as not to drop the disc often using both the hands. Therefore, there has been a problem of poor workability. In particular, when the disc is attached to the turn table, since it is necessary to align and fit a central hole of the disc with a central boss portion of the turn table, and thereafter to push the disc onto the turn table, there is a problem that workability is particularly poor.

Accordingly, the basic object of a first aspect of the present invention is to provide a rotary element assembly structure, with which, in rotatably assembling a rotary element to the tip side of a hollow shaft, the rotary element can rotatably be assembled to the tip side of the hollow shaft without use of any screw mechanism and while surely preventing the rotary element from coming off.

Further, the basic object of a second aspect of the present invention is to provide a disc apparatus, with which, in connection with an upright type disc apparatus, workability in attaching or removing a disc to or from the turn table can be enhanced.

Means for Solving the Problems

Therefore, a first aspect of the present invention provides a rotary element assembly structure for assembling a rotary element to a tip side of a hollow shaft provided upright on a pedestal so that the rotary element is capable of rotating about the hollow shaft, a) wherein the rotary element is provided with, at its rotation center portion, a cylindrical portion having an inner circumferential portion fitted with an outer circumferential portion of the hollow shaft; the cylindrical portion is provided with, in its inside, a hook strut portion having a hook portion overhanging in a radial direction on its tip side and extending substantially along a fitting direction to the hollow shaft; and a base end portion of the hook strut portion and a base end portion of the cylindrical portion are coupled to each other by a resin-made thin plate portion, b) wherein the hollow shaft is provided with, at its tip side, a small diameter portion smaller in diameter than a hollow portion of the hollow shaft; a radius of an overhang tip portion of the hook portion is set to be greater than a radius of the small diameter portion of the hollow shaft and to be smaller than a radius of the hollow portion, and c) when the rotary element is assembled to the tip side of the hollow shaft, the cylindrical portion of the rotary element is fitted with the hollow shaft, whereby the hook portion on the tip side of the hook strut portion is pushed into the hollow portion via the small diameter portion on the tip side of the hollow shaft, and the hook portion engages with a stepped portion formed by the hollow portion and the small diameter portion.

With this structure, when the rotary element is rotatably assembled to the tip side of the hollow shaft, by allowing the cylindrical portion of the rotary element to be fitted with the hollow shaft, the hook portion on the tip side of the hook strut portion is pushed into the hollow portion via the small diameter portion on the tip side of the hollow shaft. Thereby the hook portion engages with the stepped portion formed by the hollow portion and the small diameter portion, and thus the rotary element is prevented from coming off.

In this case, it is preferable that, the stepped portion is set such that its inner circumferential side is positioned toward the fitting direction of the cylindrical portion of the rotary element to the hollow shaft than its outer circumferential side is.

With this structure, the stepped portion with which the hook portion engages is set such that its inner circumferential side is positioned toward the fitting direction of the cylindrical portion of the rotary element to the hollow shaft than its outer circumferential side is. Therefore, the engagement of the hook portion with the stepped portion is not easily disengaged, and a further improvement in the effect of preventing the rotary element from coming off is achieved.

In the foregoing case, it is more preferable that, an engaging portion of the hook portion for the stepped portion is set such that its inner side is positioned toward the fitting direction than its outer side is.

With this structure, the engaging portion of the hook portion for the stepped portion is set such that its inner side is positioned toward the fitting direction than its outer side is. Therefore, the engagement of the hook portion with the stepped portion is not easily disengaged, and a further improvement in the effect of preventing the rotary element from coming off is achieved.

Further, in the foregoing case, more preferably, the outer circumferential portion of the hollow shaft is provided with an abutment receiving portion for stopping and receiving a tip portion of the cylindrical portion when the cylindrical portion of the rotary element is fitted. And when the rotary element is fitted to the tip side of the hollow shaft, in a state where the tip portion of the cylindrical portion is stopped and received on the abutment receiving portion, a gap exists between a tip portion of the hollow shaft and the thin plate portion.

With this structure, when the rotary element is assembled to the tip side of the hollow shaft, in the state where the tip portion of the cylindrical portion is stopped and received on the abutment receiving portion, the gap exists between the tip portion of the hollow shaft and the thin plate portion. Therefore, free rotation of the rotary element relative to the tip side of the hollow shaft is secured with a simple structure.

Further, in the foregoing case, further preferably, an outer circumferential portion on the tip side of the hollow shaft is provided with a small diameter portion having its outer diameter set to be small by a prescribed amount, the small diameter portion extending across a range from a tip of the outer circumferential portion to a site corresponding to a portion positioned closest to the fitting direction in the engaging portion of the hook portion for the stepped portion when the rotary element is assembled.

When the cylindrical portion of the rotary element is to be molded, it is necessary to use a molding die for molding the inner circumferential portion of the cylindrical portion and another molding die for molding the hook portion in combination. However, at the corner portions where the molding dies are joined, minute burrs are partially and inevitably generated on the surface of the mold product, and it is difficult to completely remove the burrs. Accordingly, when the rotary element cylindrical portion having such burrs partially at its inner circumference is fitted to the outer circumferential portion of the hollow shaft and rotated, the partial burrs interfere with the surface of the outer circumferential portion of the hollow shaft in accordance with the rotation, and generally extraordinary noises or vibrations occur. However, as described above, the outer circumferential portion on the tip side of the hollow shaft is provided with a small diameter portion having its outer diameter set to be small by a prescribed amount, the small diameter portion extending across a range from the tip of the outer circumferential portion to the site corresponding to the portion positioned closest to the fitting direction in the engaging portion of the hook portion for the stepped portion when the rotary element is assembled. Accordingly, even when the burrs partially exist at the inner circumference of the rotary element cylindrical portion, the interference between the burrs and the surface of the outer circumferential portion of the hollow shaft can surely be avoided.

Further, the second aspect of the present invention provides a disc apparatus of an upright type recording an information signal on and/or reproducing a recorded information signal from a disc as an information recording medium, including: a) a step-down portion that is formed to be stepped down by a prescribed amount from a surface of a front panel of the disc apparatus, the step-down portion being formed to accommodate the disc; b) a turn table that has a boss portion for fitting with a central hole of the disc, the turn table being attached to the step-down portion; c) a pocket portion formed at a bottom end portion of the step-down portion by a step-down face of the bottom end portion, a stepped wall of the bottom end portion, and a vertical wall formed to stand upright from a front edge of the stepped wall by a prescribed height, the pocket portion being capable of accommodating a bottom end portion of the disc, and d) wherein the pocket portion is set such that, in a state where the bottom end portion of the disc is accommodated, at least part of a tip portion of the boss portion of the turn table is in an inner circumferential range of the central hole of the disc.

With this structure, in the disc apparatus of the upright type, the pocket portion that can accommodate the bottom end portion of the disc is provided at the bottom end portion of the step-down portion where the turn table is attached. Therefore, when the disc is attached to or removed from the turn table, the user can tentatively place the disc in the state where the bottom end portion of the disc is accommodated in the pocket portion. Further, the pocket portion is set such that, in the state where the bottom end portion of the disc is accommodated, at least part of the tip portion of the boss portion of the turn table is in the inner circumferential range of the central hole of the disc. Therefore, when the disc is attached to the turn table, the work of aligning the central hole of the disc to the central boss portion of the turn table becomes easier.

In the case, preferably, the disc apparatus further includes a sliding door that covers a front side of the turn table so as to be capable of opening and closing, and wherein when the sliding door opens the front side of the turn table, in a state where the pocket portion accommodates the bottom end portion of the disc and part of an inner wall of the sliding door supports a corresponding side face of the disc, at least part of the tip portion of the boss portion of the turn table is in the inner circumferential range of the central hole of the disc.

With this structure, when the disc is attached to or removed from the turn table, in the state where the disc has its bottom end portion held by the pocket portion and part of the side face is supported by part of the inner wall of the sliding door, the disc can more surely be tentatively be placed.

Effects of the Invention

According to the first aspect of the present invention, when the rotary element is assembled to the tip side of the hollow shaft provided upright on the pedestal so as to rotate about the hollow shaft, the cylindrical portion that is provided at the rotation center portion of the rotary element and that has the inner circumferential portion fitted with the outer circumferential portion of the hollow shaft is fitted with the hollow shaft. Thus, the hook portion on the tip side of the hook strut portion arranged inside the cylindrical portion is pushed into the hollow portion via the small diameter portion on the tip side of the hollow shaft, and the hook portion engages with the stepped portion formed by the hollow portion and the small diameter portion. Thus, the rotary element is prevented from coming off from the hollow shaft.

That is, in rotatably assembling the rotary element to the tip side of the hollow shaft, the rotary element can rotatably be assembled to the tip side of the hollow shaft while surely preventing the rotary element from coming off and without use of any screw mechanism. Thus, an improvement in workability of the assembly step and a reduction in the number of components can be achieved. Further, it becomes possible to eliminate any possible occurrence of bulge, crack, or break at the tip side of the hollow shaft, which may otherwise occur as in the case where any screw mechanism is used.

Further, according to the second aspect of the present invention, in the disc apparatus of an upright type, the pocket portion that can accommodate the bottom end portion of the disc is provided at the bottom end portion of the step-down portion where the turn table is attached. Therefore, when the disc is attached or removed to or from the turn table, in the state where the bottom end portion of the disc is accommodated in the pocket portion, the user can tentatively place the disc, whereby convenience and workability can greatly be improved. Further, the pocket portion is set such that at least part of the tip portion of the boss portion of the turn table is in the inner circumferential range of the central hole of the disc in the state where the pocket portion accommodates the bottom end portion of the disc. Therefore, in attaching the disc to the turn table, the user can more easily perform the work of aligning the central hole of the disc with the central boss portion of the turn table.

BRIEF DESCRIPTION OF THE DRAWINGS

FIG. 1A is a perspective view being one of the drawings schematically showing the overall structure of a music reproduction apparatus according to an embodiment of the present invention, showing a fully closed state in which reproduction units are both covered by a door;

FIG. 1B is a perspective view being one of the drawings schematically showing the overall structure of the music reproduction apparatus, showing a first open state in which a CD-use reproduction unit is uncovered;

FIG. 1C is a perspective view being one of the drawings schematically showing the overall structure of the music reproduction apparatus, showing a second open state in which a PMP-use reproduction unit is uncovered;

FIG. 4A is a schematic front view of the slide door;

FIG. 6A shows the positional relationship between a driving rack gear and the idle rack, in which (a) is a plan view of the slide door and (b) is a rear view of the slide door;

FIG. 6B shows the positional relationship between the driving rack gear and the idle rack, in which (a) is a plan view of the slide door and (b) is a rear view of the slide door;

FIG. 7C is a side view schematically showing the structure of the PMP retaining mechanism;

FIG. 9H is an explanatory illustration showing the schematic structure of the bottom end portion of a rotary strut of a switching lever in an enlarged manner;

FIG. 10A is a plan view schematically showing the positional relationship and the moving operation among the PMP retaining mechanism, the driver unit, and the slide door, in a state where the front side of the PMP retaining mechanism is closed by the slide door;

FIG. 10D is a plan view showing the positional relationship and the moving operation among the PMP retaining mechanism, the driver unit, and the slide door, in a state where the PMP retaining mechanism recedes and before its front side is closed by the slide door;

PREFERRED EMBODIMENTS OF THE INVENTION

Figure 2:
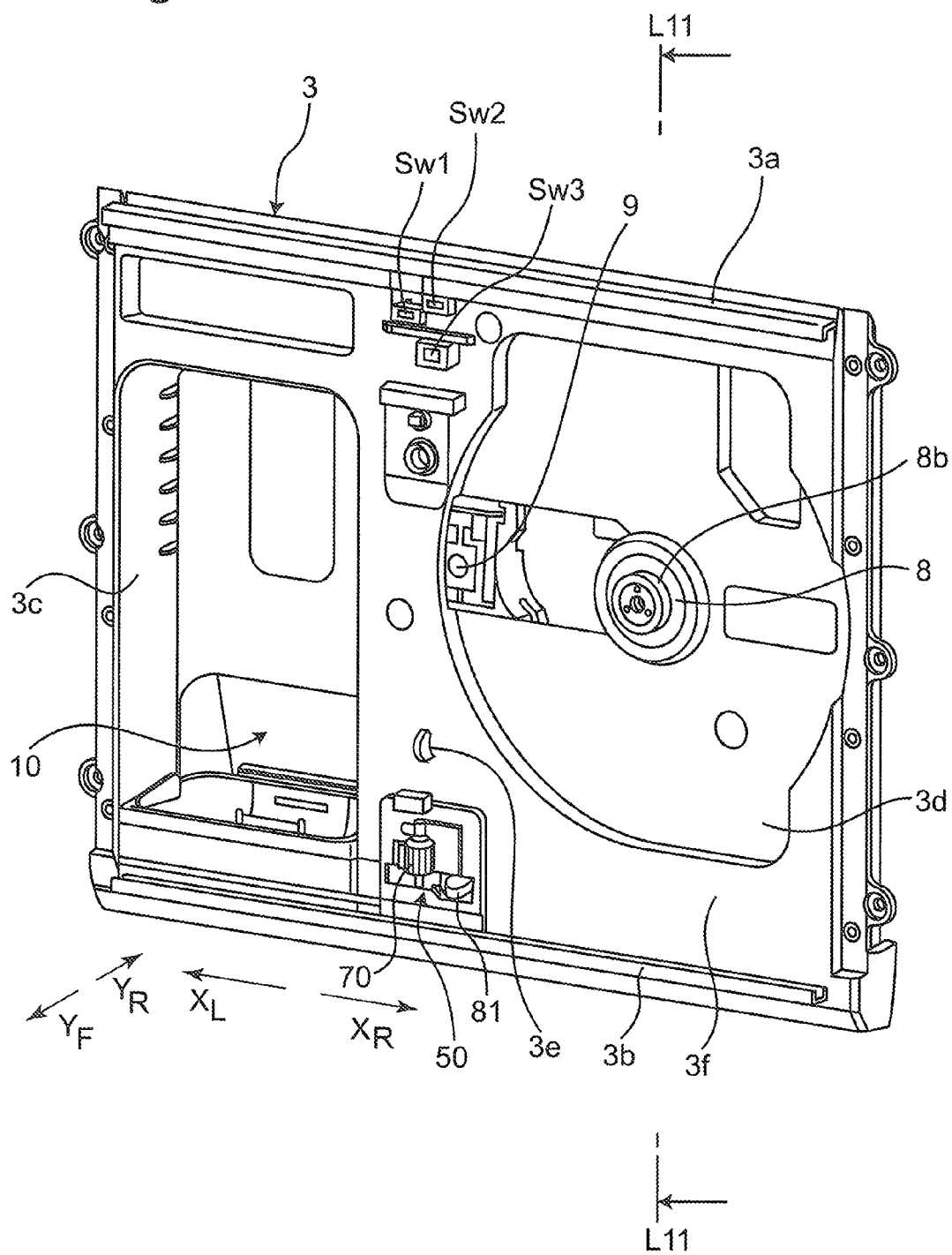
FIG. 2 is a schematic perspective view as seen from the front of a front panel in a state where the slide door of the music reproduction apparatus is removed.

Hereinafter, with reference to the drawings, a detailed description will be given of a music reproduction apparatus according to an embodiment of the present invention. It is to be noted that, in the following description, though the terms referring to particular directions (for example, "top", "bottom", "left", "right", "front", "back", "the clockwise direction", "the counterclockwise direction", and other terms including them) are used, use of the terms is for the purpose of facilitating understanding of the invention with reference to the drawings, and the present invention should not be interpreted as being limited by particular meaning of such terms. Further, in connection with the music reproduction apparatus described in the following, identical or similar constituents are denoted by identical reference symbols.

The music reproduction apparatus according to the present embodiment includes, as will become apparent from the following description, a reproduction unit that performs music reproduction employing, e.g., a compact disc (hereinafter appropriately abbreviated as the "CD"), as an external audio source, and a reproduction unit that performs music reproduction employing, e.g., a portable media player (hereinafter appropriately abbreviated as the "PMP"), as an external audio source. These reproduction units are arranged next to each other in front view. With the music reproduction apparatus, which reproduction unit is to be used can be selectively switched to perform reproduction.

FIGS. 1A to 1C are each a perspective view schematically showing the overall structure of the music reproduction apparatus according to the present embodiment. FIG. 1A shows the fully closed state where both the reproduction units are covered by a door. FIG. 1B shows the first open state where the CD-use reproduction unit is uncovered. FIG. 1C shows the second open state where the PMP-use reproduction unit is uncovered.

With reference to these drawings, a more detailed description will be given. The music reproduction apparatus (hereinafter appropriately abbreviated as "apparatus") includes a CD reproduction unit U1 that performs music reproduction employing a CD 5 as an external audio source and a PMP reproduction unit U2 that performs music reproduction employing a PMP 6 as an external audio source. The reproduction units U1 and U2 are arranged next to each other in the left-right direction in front view, for example.

Further, on both the right and left side of the reproduction units U1 and U2, a pair of speaker apparatuses Sp is aligned. The reproduction units U1 and U2 and the pair of speaker apparatuses Sp and Sp are accommodated in an outer case 2 in the state as being aligned in the left-right direction on the front side of the outer case 2 of the apparatus 1. On the front side of the central region of the outer case 2, a front panel 3 is attached. The reproduction unit U1 and the PMP reproduction unit U2 are installed in the outer case 2 using the front panel 3 as a mounting base.

The CD reproduction unit U1 has a turntable 8 (see FIG. 1B) as a retaining mechanism that can rotatably retain the CD 5. On the other hand, the PMP reproduction unit U2 has a PMP retaining mechanism 10 (see FIG. 1C) on which the PMP 6 can be placed and retained.

It is to be noted that, since the structure for the CD reproduction unit U1 to perform music reproduction using the CD 5 as an external audio source, and the structure for the PMP reproduction unit U2 to perform music reproduction using the PMP 6 as an external audio source are both similar to the conventionally known structures, the detailed description thereof will not be given.

On the front side of the front panel 3, an opening-closing door (slide door) 30 that is slidable in the left direction (the arrow $X_L$ direction) and the right direction (the arrow $X_R$ direction) in the drawings is arranged. The slide door 30 covers the front side of at least one of the CD reproduction unit U1 and the PMP reproduction unit U2 in an openable and closable manner.

More specifically, defining the fully closed position (see FIG. 1A) that covers the front side of both the reproduction units U1 and U2 (the arrow $Y_F$ direction) as the initial position, when the slide door 30 moves from the initial position by a predetermined amount in the left direction (the arrow $X_L$ direction) in the drawings, the slide door 30 arrives at the first open position (see FIG. 1B) that only opens the front side of the CD reproduction unit U1 while the front side of the PMP reproduction unit U2 remaining closed. When the slide door 30 is at the first open position (i.e., in the first open state), the user can freely attach or remove the CD 5 to or from the turn table 8 of the CD reproduction unit U1.

On the other hand, when the slide door 30 moves by a predetermined amount from the initial position in the right direction (the arrow $X_R$ direction) in the drawings, the slide door 30 arrives at the second open position (see FIG. 1C) that only opens the front side of the PMP reproduction unit U2 while the front side of the CD reproduction unit U1 remaining closed. In this manner, when the slide door 30 is at the second open position (i.e., in the second open state), the user can freely attach or remove the PMP 6 to or from the PMP retaining mechanism 10 of the PMP reproduction unit U2.

On the top face of the central region of the outer case 2, operation buttons 4c and 4p for manually operating the slide door 30 are provided. The operation button 4c on the CD reproduction unit U1 side is used in the case where the slide door 30 is operated so as to open or close the front side of the CD reproduction unit U1. That is, the operation button 4c is used when the slide door 30 is moved from the fully closed position (see FIG. 1A) to the first open position (see FIG. 1B), or in the reverse direction. On the other hand, the operation button 4p on the PMP reproduction unit U2 side is used in the case where the slide door 30 is operated so as to open or close the front side of the PMP reproduction unit U2. That is, the manipulation button 4p is used when the slide door 30 is moved from the fully closed position (see FIG. 1A) to the second open position (see FIG. 1C), or in the reverse direction.

Such manipulation of the slide door 30 can also be performed using a remote controller. Further, it is also possible to arrange a contactless sensor near each of the operation buttons 4c and 4p, for example, such that the user can hold his/her hand over the sensor and move the hand in the right or left direction, to thereby move the slide door 30 in the direction.

In the present embodiment, as will be described in detail later, in the state where the front side of the PMP reproduction unit U2 is covered by the slide door 30, the PMP retaining mechanism 10 is located in the accommodation position on the deeper side than the slide door 30, that is, on the rear side (the arrow $Y_R$ direction), and when the slide door 30 is moved and whereby the front side of the PMP retaining mechanism 10 is uncovered, the PMP retaining mechanism 10 is drawn from the accommodation position toward the front side (the arrow $Y_F$ direction) in association with the moving operation of the slide door 30, and moves to the draw out position (see FIG. 1C).

Figure 3:
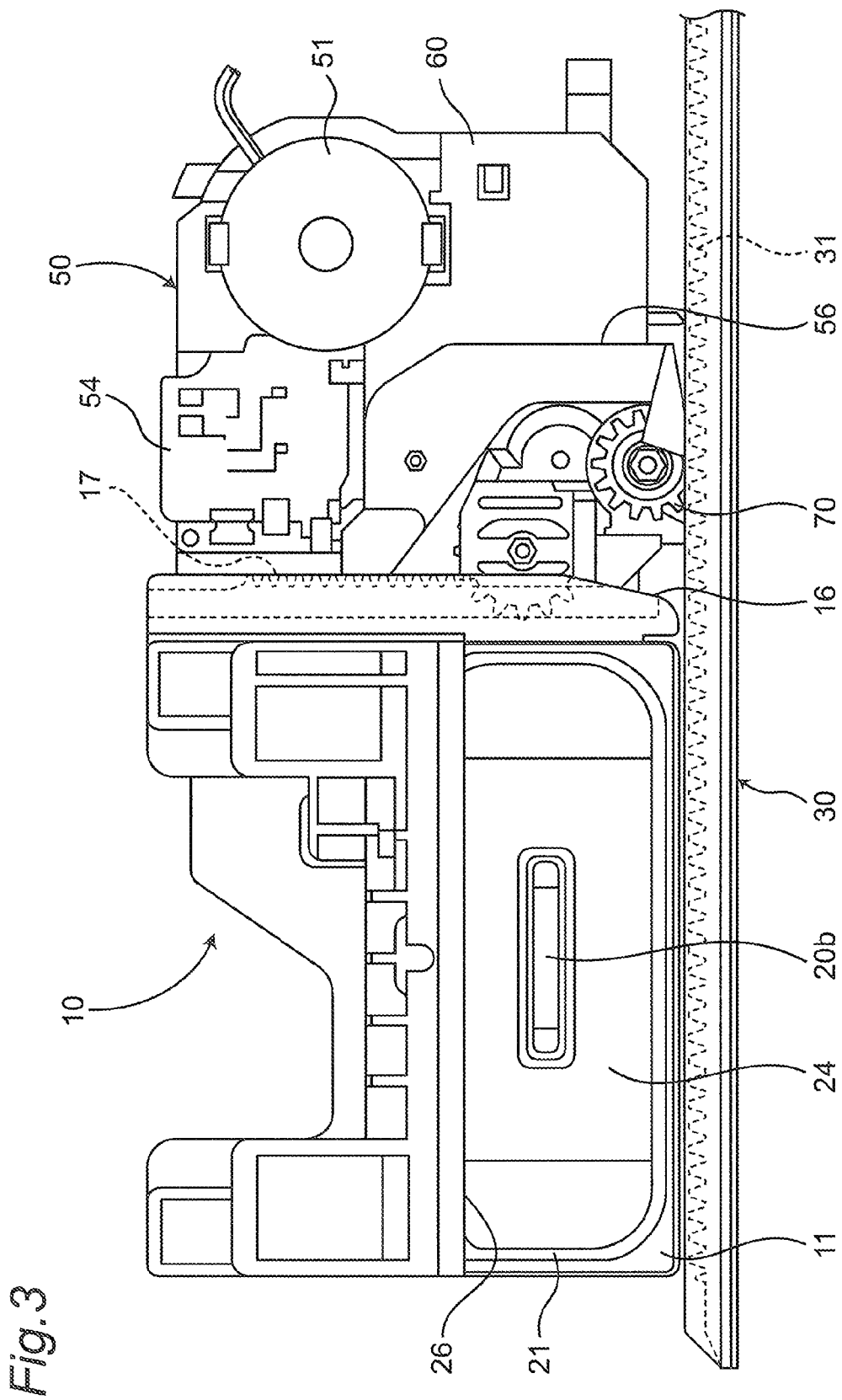
FIG. 3 is a plan view schematically showing the positional relationship of the slide door, a PMP retaining mechanism, a driver unit and the like of the music reproduction apparatus.

FIG. 2 is a perspective view as seen from the front side of the front panel 3 in the state where the slide door 30 is removed. Further, FIG. 3 is a plan view schematically showing the positional relationship of the slide door 30, the PMP retaining mechanism 10, a driver unit 50 and the like.

As shown in the drawings, on the front side near the top edge and the bottom edge of the front panel 3, a pair of top and bottom parallel guide rails 3a and 3b is provided so as to extend in the left-right direction (the arrows $X_L$ and $X_R$ direction) in the drawings along the top edge and the bottom edge for guiding the sliding operation of the slide door 30. The PMP reproduction unit U2 and the CD reproduction unit U1 are arranged as being aligned on the left and right sides between the top and bottom guide rails 3a and 3b.

In the region of the front panel 3 corresponding to the CD reproduction unit U1, a step-down face 3d as being recessed by a slight amount from a surface 3f of the front panel 3 is formed, and the turn table 8 is attached using this step-down face 3d as the base face. Further, by a side of the turn table 8, a conventionally-known optical pickup 9 is arranged slidably at least in the radial direction of the turn table 8.

On the other hand, in the region of the front panel 3 corresponding to the PMP reproduction unit U2, a recess portion 3c formed to be substantially rectangular in front view and to be recessed from the surface 3f of the front panel 3 by a predetermined depth is provided. The PMP retaining mechanism 10 is accommodated in the recess portion 3c so as to be movable by a predetermined amount in the front and rear directions (in the directions of arrows $Y_F$ and $Y_R$). The mechanism and operation of the PMP retaining mechanism 10 moving in the front and rear directions will be detailed later.

Further, as will be detailed later, between the region of the front panel 3 corresponding to the CD reproduction unit U1 and the region corresponding to the PMP reproduction unit U2, e.g., at the portion substantially central at the bottom portion of the front panel 3, the driver unit 50 which has, e.g., an electric motor 51 (see FIG. 3) as the drive source is positioned.

Further, for example near the driver unit 50, as will be described later, a coming off prevention-purpose protrusion 3e for preventing the slide door 30 from coming off during the slide door 30 is in the sliding operation mode is arranged.

Still further, for example at a relatively top portion of the front panel 3, position detection switches Sw1, Sw2, and Sw3 for the slide door 30 are arranged. As will be detailed later, the switches Sw1 to Sw3 are structured to engage with the protrusions formed on the back side of the slide door 30, to thereby be pressed down to turn on.

By an ON/OFF state of the door position detection switches Sw1, Sw2, and Sw3 being sensed, it becomes possible to recognize at which position the slide door 30 is, i.e., at the fully closed position covering the front side of both the reproduction units U1 and U2 (see FIG. 1A), the first open position opening solely the front side of the CD reproduction unit U1 while still covering the front side of the PMP reproduction unit U2 (see FIG. 1B), or the second open position opening solely the front side of the PMP reproduction unit U2 while still covering the front side of the CD reproduction unit U1 (see FIG. 1C).

Figure 4B:
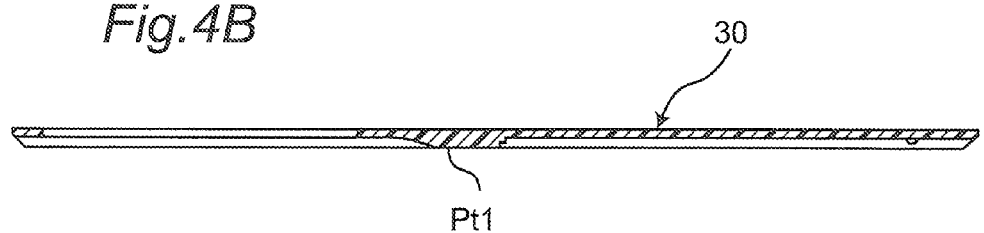
FIG. 4B is a schematic cross-sectional view of the slide door taken along a line Lb-Lb in FIG. 4A.

Next, a description will be given about the structure of the slide door 30. FIG. 4A is a schematic front view of the slide door 30. FIGS. 4B to 4F are schematic cross-sectional views of the slide door taken along lines Lb-Lb to Lf-Lf in FIG. 4A, respectively. Further, FIG. 4G is a view on arrow as seen from the arrow Lg-arrow Lg direction in FIG. 4A.

As shown in FIG. 4A, in the left side region of the slide door 30 in the drawing, an opening window 38 in the size and shape corresponding to the indication display of the PMP 6 is formed. This window 38 is positioned such that it is at the position corresponding to the indication display of the PMP 6 when the slide door 30 is at the fully closed position (see FIG. 1A). Accordingly, use of a transparent or translucent decoration plate 39 (see FIG. 4G) that covers and decorates the front side of the slide door 30 makes it possible for the user to visually recognize from outside the indication display of the PMP 6 even when the slide door 30 is at the fully closed position.

On the back side of near the top edge and the bottom edge of the slide door 30, engaging grooves 30a and 30b extending in the left-right direction (the arrows $X_L$, $X_R$ direction) are formed so as to engage with the guide rails 3a and 3b at the top and bottom of the front panel 3 provided on the front side of the central region of the outer case 2. The shape of the engaging grooves 30a and 30b can be clearly seen from FIG. 4G, for example.

Further, for example at the relatively top portion on the back side of the slide door 30, position detection-purpose protrusions Pt1, Pt2, and Pt3 are formed at the top-bottom direction position so as to respectively correspond to the position detection switches Sw1, Sw2, and Sw3 which are arranged, for example, at the relatively top portion of the front panel 3 (see FIGS. 4A and 4B). When the slide door 30 performs a sliding operation in the left-right directions, the position detection-purpose protrusions Pt1, Pt2, and Pt3 also move. Then, at least one of the protrusions Pt1, Pt2, and Pt3 engages with at least one of the switches Sw1, Sw2, and Sw3, to press down to turn ON the engaged switch.

By the switch Sw1 being turned ON, it is detected that the slide door 30 is at the fully closed position (see FIG. 1A). Further, by the switch Sw3 being turned ON, it is detected that the slide door 30 is at the first open position (see FIG. 1B). Further, when the switch Sw2 is turned ON, emission of the CD reading-purpose laser light is stopped immediately after the slide door 30 starts moving in the first open position direction, for the purpose of securing safety.

Thus, the front panel 3 is provided with the position detection switches Sw1 and Sw3 that respectively detect that the slide door 30 is at the fully closed position (see FIG. 1A) and the first open position (see FIG. 1B). Further, on the back side of the slide door 30, the protrusions Pt1 and Pt3 for operating the position detection switches that respectively correspond to the fully closed position and the first open position of the slide door 30 are provided. This allows the position detection switches Sw1 and Sw3 to be actuated in accordance with moving of the slide door 30, to detect that the slide door 30 is at the fully closed position and the first open position, respectively.

Figure 4C:
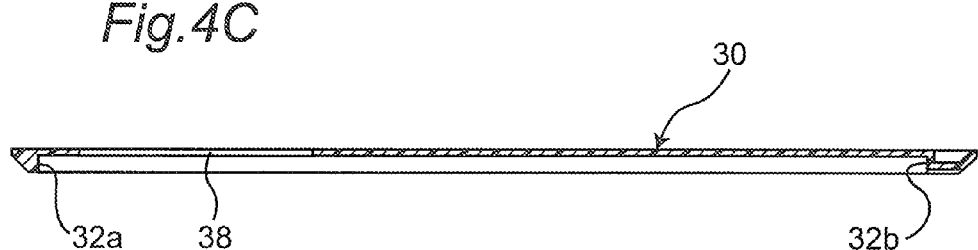
FIG. 4C is a schematic cross-sectional view of the slide door taken along a line Lc-Lc in FIG. 4A.

Further, on the back side of the slide door 30, at the position corresponding to, in terms of the top-bottom direction, the coming off prevention-purpose protrusion 3e provided at the front panel 3, abutting faces 32a and 32b are provided near the right and left opposite ends of the slide door 30 (see FIGS. 4A and 4C). When the slide door 30 slides toward the left side in FIG. 4A (the arrow $X_L$ direction), at the end of the sliding move, the abutting face 32b on the right end side abuts on the coming off prevention-purpose protrusion 3e and is stopped thereby; when the slide door 30 slides toward the right side (the arrow $X_R$ direction), at the end of the sliding move, the abutting face 32a on the left end side abuts on the coming off prevention-purpose protrusion 3e and is stopped thereby. Thus, the terminal positions of the sliding operation of the slide door 30 are determined, and the slide door 30 is prevented from coming off.

Figure 4D:
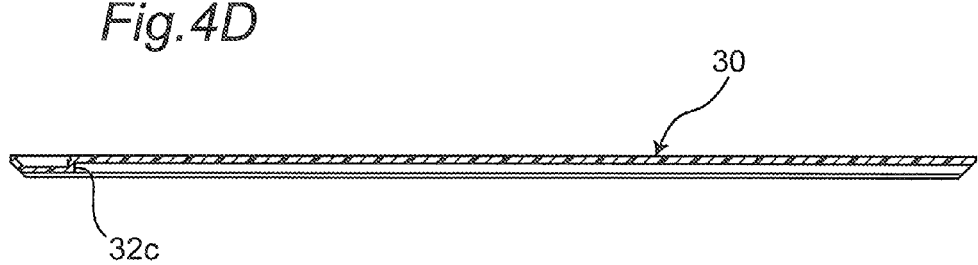
FIG. 4D is a schematic cross-sectional view of the slide door taken along a line Ld-Ld in FIG. 4A.

Still further, on the back side of the slide door 30, as will be described later, at the position corresponding to, in terms of the top-bottom direction, the tip portion of a second arm 56c of a switching lever 56 assembled into the driver unit 50, an abutting face 32c is provided near the left end of the slide door 30 (see FIGS. 4A and 4D). The abutting face 32c is positioned on the right side by a prescribed amount than the abutting face 32a on the left end side that acts when the sliding movement of the slide door 30 terminates. Then, when the slide door 30 slides to the right side in FIG. 4A (the arrow $X_R$ direction) to move to the second open position (see FIG. 1C) where the front side of the PMP retaining mechanism 10 is opened, the abutting face 32c abuts on the tip portion of the second arm 56c of the switching lever 56 before the slide door 30 arrives at the end, thereby providing the switching lever 56 with the rotary force in a prescribed direction (e.g., the counterclockwise direction).

Figure 4E:
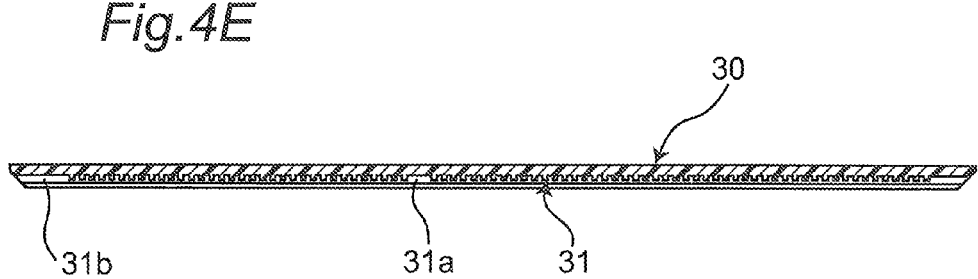
FIG. 4E is a schematic cross-sectional view of the slide door taken along a line Le-Le in FIG. 4A.

Still further, on the back side of the slide door 30, a driving rack gear 31 extending in the left-right direction (the arrows $X_L$ and $X_R$ direction) for driving the slide door 30 is arranged (see FIGS. 4A and 4E). The driving rack gear 31 meshes with a driving gear 70 (i.e., the first driving gear) assembled into the driver unit 50 as will be described later, and driven by the first driving gear 70.

At the substantially central portion of the rack gear 31, a central notch 31a with no gear tooth is provided. In the fully closed state of the slide door 30 (see FIG. 1A), the central notch 31a corresponds to the first driving gear 70, and the first driving gear 70 and the rack gear 31 become out of mesh. Further, the left end of the rack gear 31 also is provided with a left end notch 31b with no gear tooth. When the slide door 30 is at the second open position where the front side of the PMP retaining mechanism 10 is open (see FIG. 1C), the left end notch 31b corresponds to the first driving gear 70, and again the first driving gear 70 and the rack gear 31 become out of mesh.

Figure 4F:
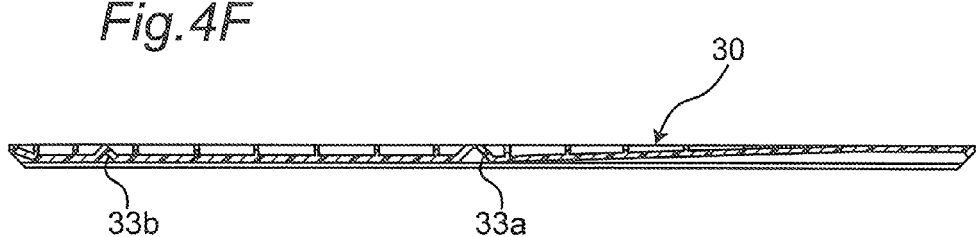
FIG. 4F is a schematic cross-sectional view of the slide door taken along a line Lf-Lf in FIG. 4A.
Figure 4G:
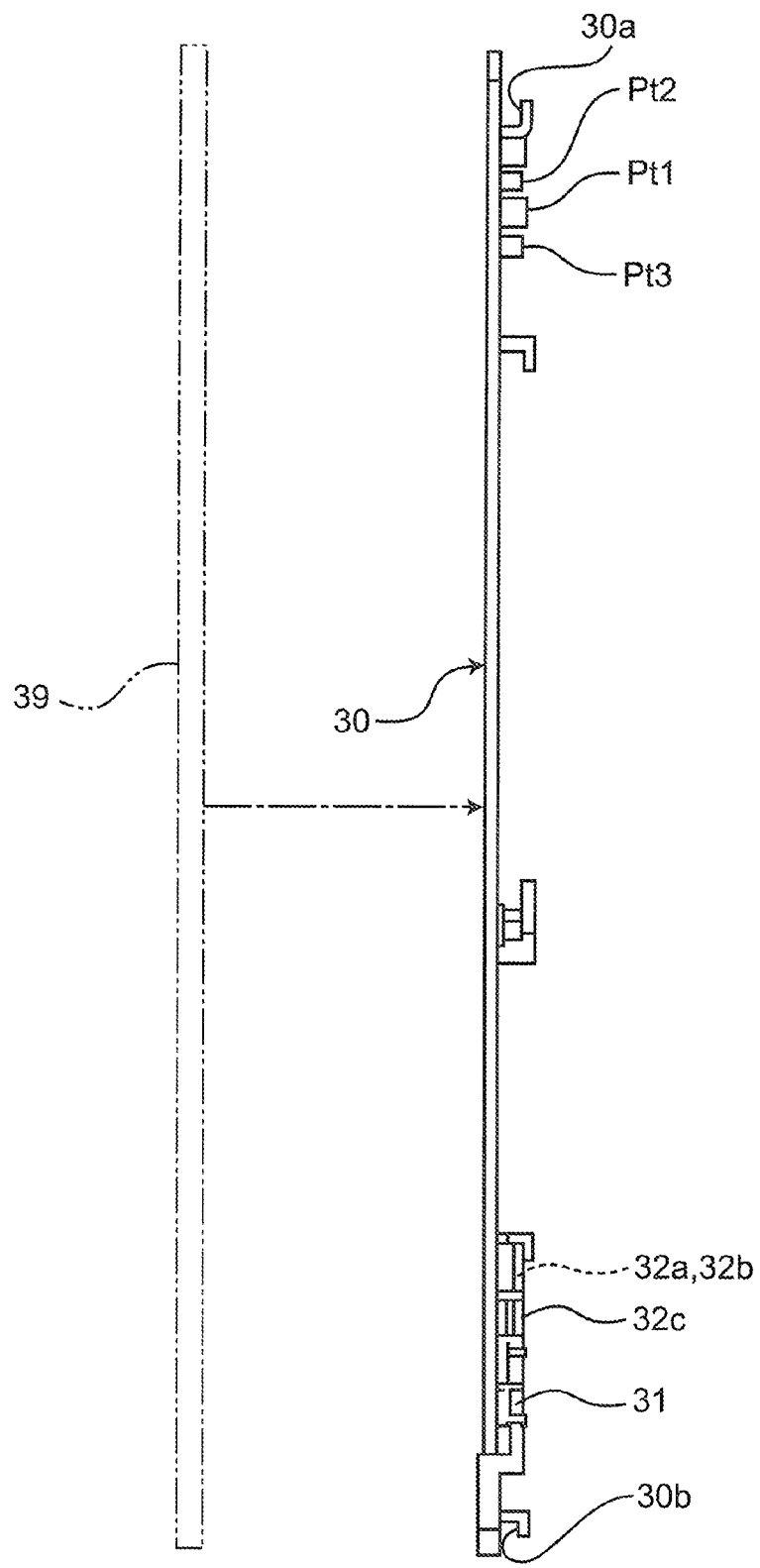
FIG. 4G is a view on arrow seen from an arrow Lg-arrow Lg direction in FIG. 4A.

Further, on the back side of the slide door 30, as will be described later, cam grooves 33a and 33b each having a slope face that can engage with a positioning piece 81 assembled into the driver unit 50 are formed (see FIGS. 4A and 4F).

On the front side of the slide door 30 structured as described above, the decoration plate 39 that is translucent, for example, is attached so as to cover and decorate the front side of the slide door 30 (see FIG. 4G).

Figure 5A:
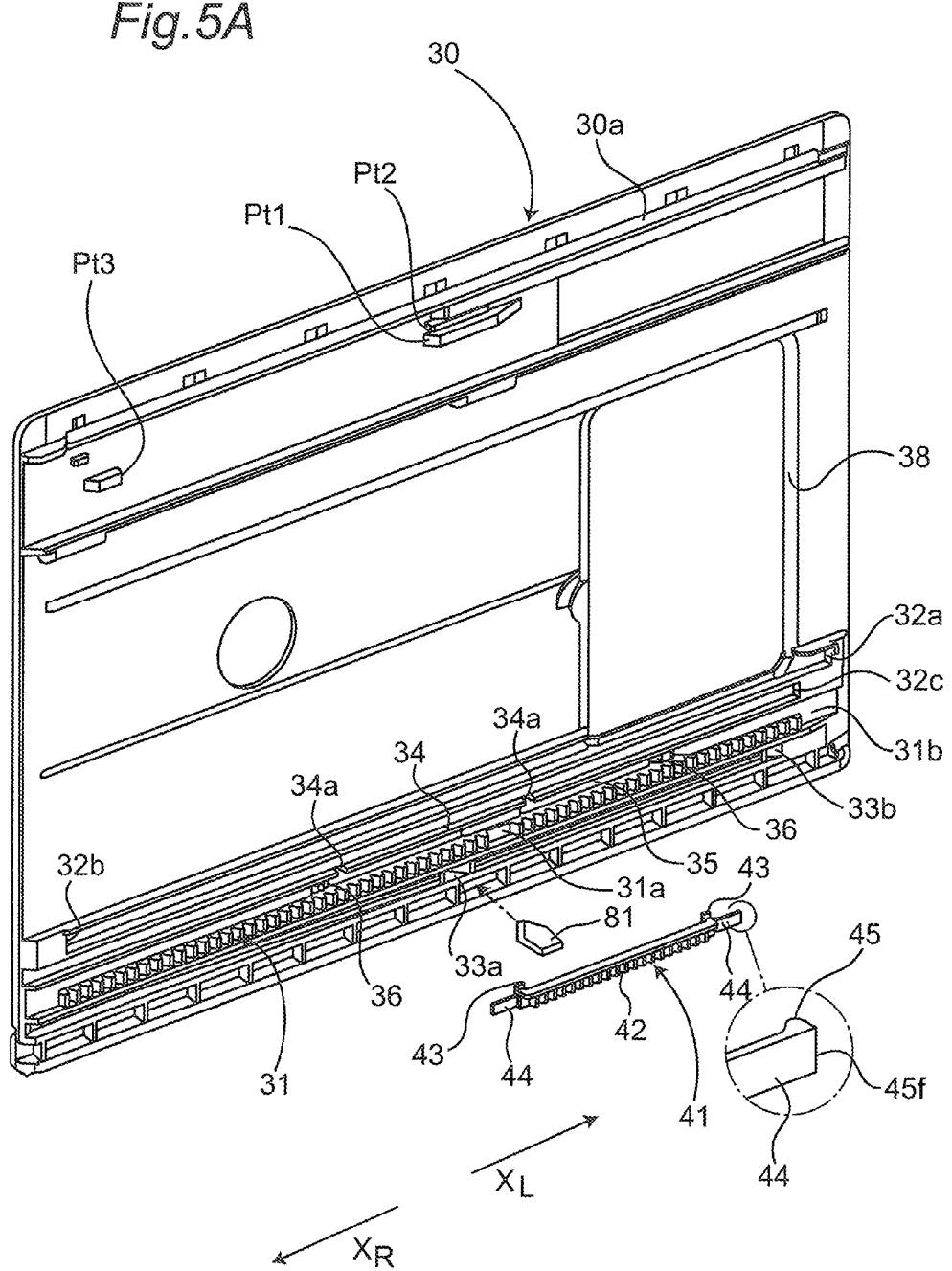
FIG. 5A is a perspective view showing the mounted state of an idle rack to the slide door as seen from the back side of the slide door.

Next, a description will be given of an idle rack 41 attached to the slide door 30. FIG. 5A is a perspective view showing the attaching manner of the idle rack 41 to the slide door 30 as seen from the back side of the slide door 30. Further, FIG. 5B is a cross-sectional view showing the assembled state of the idle rack 41 to the slide door 30 in an enlarged manner.

As shown in the drawings, the idle rack 41 extends along the driving rack gear 31 and is assembled into a space 35 above the driving rack gear 31. The idle rack 41 can freely slide in the left-right directions in the space 35 formed between a lateral wall 34 extending in the left-right direction on the back side of the slide door 30 and the top face of the driving rack gear 31. A rack gear 42 (idle rack gear) is provided at most of the idle rack 41 in the longitudinal direction. The module of the idle rack gear 42 is set to be identical to the module of the driving rack gear 31 of the slide door 30.

At each of the opposite ends of the idle rack gear 42, a hook portion 43 that projects in the top-bottom direction by a predetermined amount is formed. The hook portions 43 provide a slip-off preventing function of preventing the idle rack 41 from coming off from the slide door 30 to the back side when the idle rack 41 slides in the left-right directions along and on the top side of the driving rack gear 31. On the lateral wall 34, notches 34a and 34a corresponding to the hook portions 43 and 43 are formed. When the idle rack 41 is assembled into the back side of the slide door 30, the hook portions 43 and 43 are inserted from the notches 34a and 34a.

Figure 5B:
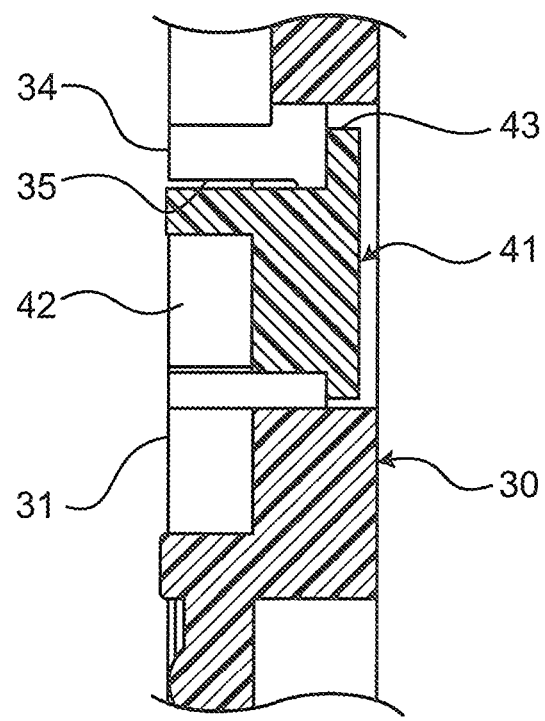
FIG. 5B is an enlarged cross-sectional view showing the assembled state of the idle rack into the slide door.

Thus, as shown in detail in FIG. 5B, the idle rack 41 can freely slide in the left-right directions (the direction perpendicular to the surface of FIG. 5B) in the space 35 between the lateral wall 34 and the top face of the driving rack gear 31. Further, by the hook portions 43 engaging with at least the lateral wall 34, the idle rack 41 can be surely prevented from coming off from the slide door 30 to the back side.

Further, on the right and left opposite ends of the idle rack 41, leaf portions 44 and 44 extending from the ends of the idle rack gear 42 in the longitudinal direction are respectively provided. At each end of the leaf portion 44, a cam-shaped portion 45 is formed.

Figure 5C:
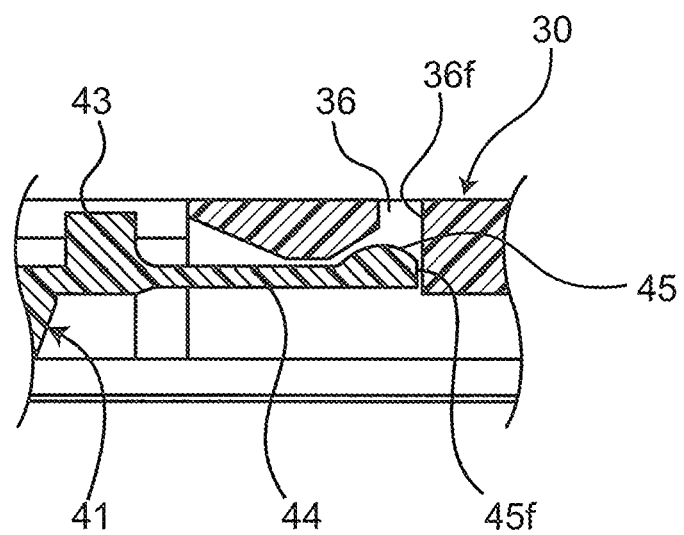
FIG. 5C is an enlarged cross-sectional view showing a cam-shaped portion of a leaf portion terminal of the idle rack is engaged with a groove on the back side of the slide door.

FIG. 5C is a cross-sectional view showing the state of the cam-shaped portion 45 being engaged with the groove 36 provided at the back side of the slide door 30 in an enlarged manner. When the idle rack 41 slides to move in the right direction in FIG. 5A, for example, it is set such that when the move ends, an end face 45f of the cam-shaped portion 45 abuts on a wall surface 36f of the groove 36, and the cam-shaped portion 45 enters inside the groove 36 to be retained by that position under the light spring pressure of the leaf portion 44.

Figure 6C:
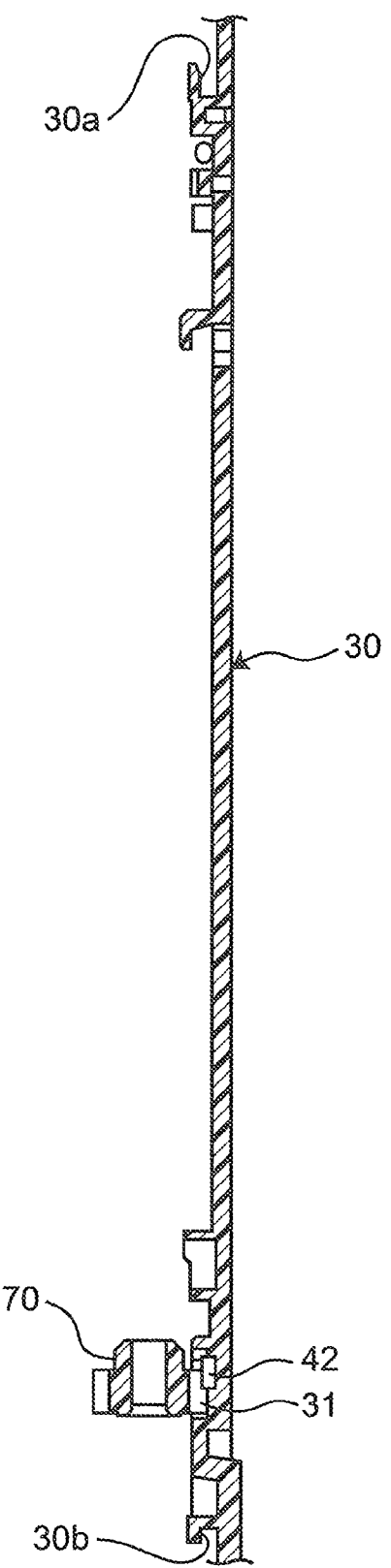
FIG. 6C is a vertical cross-sectional view showing the positional relationship of the driving rack gear and the idle rack gear for the slide door, to a first driving gear of the driver unit.

FIGS. 6A and 6B each show the positional relationship between the driving rack gear 31 and the idle rack 41. In each of the drawings, (a) is a plan view of the slide door 30, and (b) is a rear view of the slide door 30. Further, FIG. 6C is a cross-sectional view showing the positional relationship between the driving rack gear 31 and the idle rack gear 42 of the slide door 230 and the first driving gear 70 of the driver unit 50.

FIG. 6A shows the state where the idle rack 41 moves in the arrow $X_R$ direction, and the end face 45f of the cam-shaped portion 45 of the idle rack 41 abuts on the wall surface 36f of the groove 36 of the slide door 30. It is structured such that, in this state, the driving rack gear 31 of the slide door 30 and the idle rack gear 42 of the idle rack 41 are in phase.

As can be clearly seen from FIG. 6C, the tooth of the first driving gear 70 have their position in top-bottom direction and dimension set such that they can mesh with both the driving rack gear 31 and the idle rack 41. For example, the top-bottom direction dimension of the tooth of the first driving gear 70 is more preferably set to be greater than the top-bottom direction dimension of the driving rack gear 31.

With such a structure, as to the tooth-lacking portion of the central notch 31a of the driving rack gear 31 of the slide door 30 also, by the idle rack gear 42 meshing with the first driving gear 70, the meshing relationship of the gears can be continuously maintained between the driver unit 50 side and the slide door 30 side.

FIG. 6B shows the state where the idle rack 41 moves in the arrow $X_L$ direction and, similarly to the state shown in FIG. 6A, the end face 45f of the cam-shaped portion 45 of the idle rack 41 abuts on the wall surface 36f of the groove 36 of the slide door 30. It is also structured such that, in this state, the driving rack gear 31 of the slide door 30 and the idle rack gear 42 of the idle rack 41 are in phase. Further, similarly to the case shown in FIG. 6A, as to the tooth-lacking portion of the left end notch 31b of the driving rack gear 31 of the slide door 30, by the idle rack gear 42 meshing with the first driving gear 70, the meshing relationship of the gears can be continuously maintained between the driver unit 50 side and the slide door 30 side.

With reference chiefly to FIGS. 6A and 6B, a description will be given of the operation of the idle rack 41 thus structured.

In the state of FIG. 6A, by the positioning piece 81 engaging with the cam groove 33a formed on the back side of the slide door 30, the central notch 31a corresponds to the first driving gear 70, and the first driving gear 70 and the driving rack gear 31 are out of mesh. However, since the idle rack gear 42 and the first driving gear 70 mesh with each other, when the first driving gear 70 is rotated in the clockwise direction (CW direction) in FIG. 6A (a), while the slide door 30 is kept stationary, the idle rack 41 moves in the arrow $X_L$ direction, to enter the state shown in FIG. 6B.

When the first driving gear 70 is further continuously rotated in the clockwise direction (CW direction), the end face 45f of the cam-shaped portion 45 of the idle rack 41 abuts on the wall surface 36f of the groove 36 of the slide door 30, and the rotary drive force of the motor is transmitted to the slide door 30 via the first driving gear 70 and the idle rack 41. This causes the slide door 30 side to move in the arrow $X_L$ direction, to be brought at the first open position (see FIG. 1B) where the disc 5 can be attached or removed.

In order to cause the slide door 30 to move from the first open state where the CD 5 can be attached or removed (see FIG. 1B) or the second open state where the PMP 6 can be attached or removed (see FIG. 1C) to the fully closed position (see FIG. 1A), and to be stopped there, an accurate stop operation is required.

In the case where the driving rack gear 31 of the slide door 30 is not provided with the central notch 31a, the rotation of motor is stopped by a motor stop signal output from the fully closed position detection switch, however, the stop position of the slide door 30 will not be stable due to overrun by the inertia of the rotor of the motor, or changes in the brake load attributed to variations in the load of the slide door 30.

In the present embodiment, the driving rack gear 31 of the slide door 30 is provided with the central notch 31a, with which the positioning piece 81 is associated, whereby the accurate stop operation when the slide door 30 is totally closed is realized. A description will be given of this stop operation, taking up an exemplary case where the slide door 30 is moved from the second open state where the PMP 6 can be attached or removed (see FIG. 1C) to the fully closed position (see FIG. 1A).

When the first driving gear 70 is rotated in the clockwise direction (CW direction), the slide door 30 is moved in the arrow $X_L$ direction by the driving rack gear 31. When the central notch 31a passes the rack gear end, the first driving gear 70 and the driving rack gear 31 becomes out of mesh, which disconnects the gear transmission. At this point, the positioning piece 81 engages with the cam groove 33a along the slope face of the cam groove 33a, and the slide door 30 stops at the center position by the biasing force of the spring acting on the positioning piece 81.

At this time, since the rotor of the motor is rotating by inertia, the idle rack 41 moves in the arrow $X_L$ direction, however, the slide door 30 can stay in the stopped state at the center position corresponding to the fully closed position. That is, setting the rotation amount by inertia of the motor about half the length of the idle rack gear 42, the slide door 30 can be easily centered without being affected by the overrun due to the motor inertia or variations in the brake load. As to the moving mode from the first open state where the CD 5 can be attached or removed (see FIG. 1B) to the fully closed position (see FIG. 1A) also, centering can be performed based on the same principle as described in the foregoing.

Figure 7A:
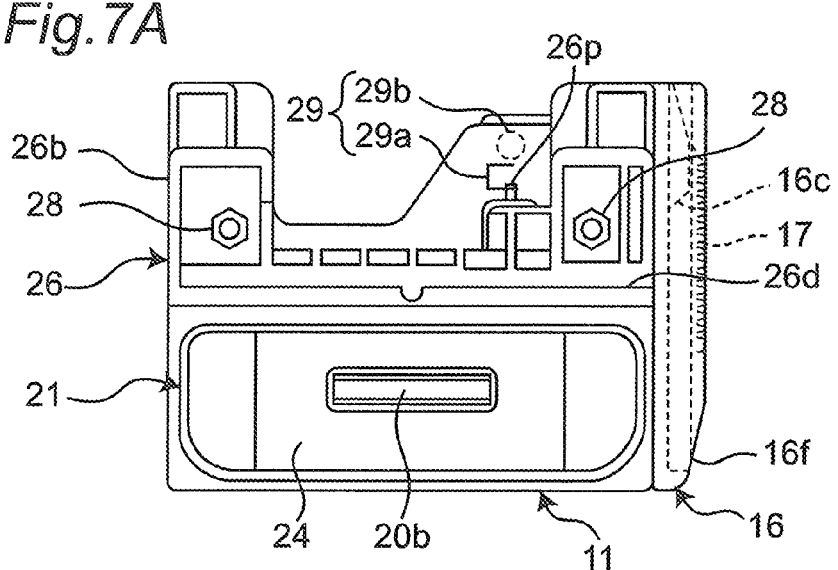
FIG. 7A is a plan view schematically showing the structure of the PMP retaining mechanism.
Figure 7B:
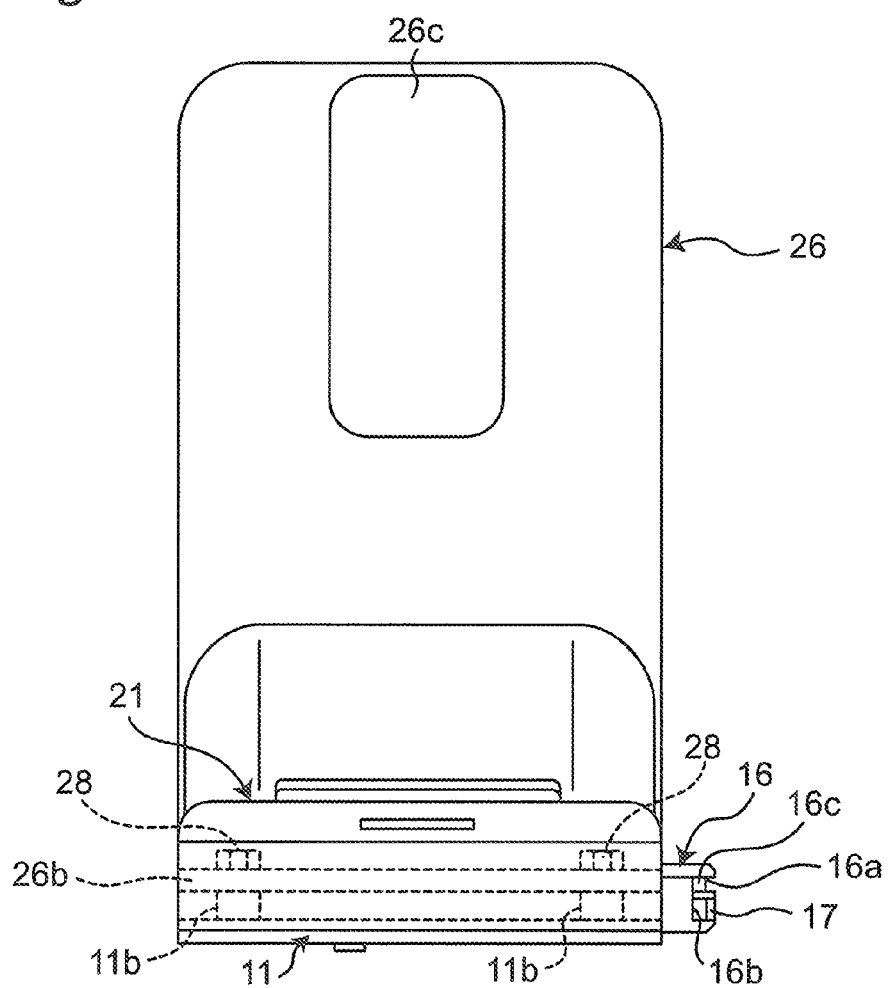
FIG. 7B is a front view schematically showing the structure of the PMP retaining mechanism.
Figure 8:
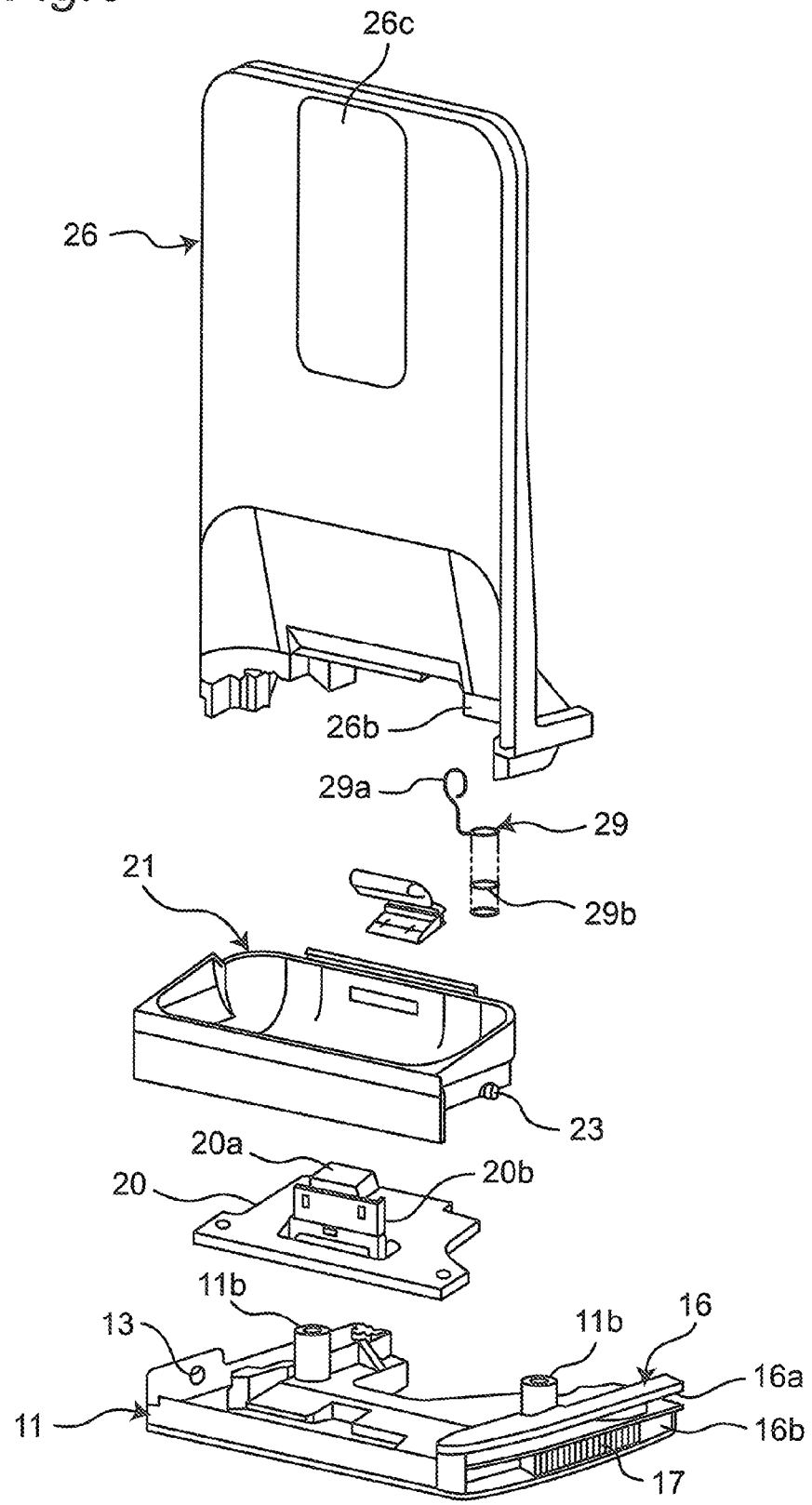
FIG. 8 is an exploded perspective view schematically showing the structure of the PMP retaining mechanism.

Next, a description will be given of the PMP retaining mechanism 10. FIGS. 7A, 7B and 7C are respectively a plan view, a front view, and a side view each schematically showing the structure of the PMP retaining mechanism 10. Further, FIG. 8 is an exploded perspective view schematically showing the structure of the PMP retaining mechanism 10.

As shown in the drawings, the PMP retaining mechanism 10 includes, as basic constituents, a base pedestal 11 that serves as the base for the entire PMP retaining mechanism 10, a drive side portion 16 that receives the drive force from the driver unit 50, a terminal block 21 that supports the bottom of the PMP 6, and a back supporter 26 that serves as a backrest supporting the back of the PMP 6.

The base pedestal 11 is positioned at the bottommost in the PMP retaining mechanism 10, and the drive side portion 16 is integrally formed at the side portion (the right side portion in the drawings) thereof. Further, the terminal block 21 is assembled immediately above the base pedestal 11. On the terminal block 21, the back supporter 26 is arranged.

The PMP retaining mechanism 10 assembled in this manner is accommodated in the recess portion 3c at a portion recessed by a predetermined depth from the surface 3f of the front panel 3, so that it can move by a predetermined amount in the front and rear directions (in the directions of arrows $Y_F$ and $Y_R$) (see FIG. 2).

On the bottom side of the terminal block 21, a printed circuit board 20 including a connector 20a and a connector terminal 20b is assembled, and the connector terminal 20b provided upright at the top of the printed circuit board 20 penetrates the floor of the terminal block 21 and projects upward. The PMP 6 has its terminal socket portion (not shown) at its bottom portion fitted to the connector terminal 20b. When the PMP 6 is placed on the terminal block 21 in this state, the PMP 6 is electrically connected to the printed circuit board 20, and is electrically connected to the reproduction portion (not shown) of the PMP reproduction unit U1 via the connector 20a.

In the present embodiment, more preferably, a reflecting mirror 24 is bonded to the bottom of the terminal block 21. When the user mount the PMP 6 on the terminal block 21, the terminal socket portion at the bottom portion of the PMP 6 is reflected upon the reflecting mirror 24. This makes it possible for the user to visually recognize the portion to be connected to the connector terminal 20b (i.e., the terminal socket portion of the PMP 6) from the insertion direction of the PMP 6 (from above), thereby facilitating fitting to the connector terminal 20b. Thus, the attachment workability of the PMP 6 can be remarkably improved.

On the right and left side portions at the relatively bottom portion of the terminal block 21, rotary pivots 23 and 23 that are, for example, pin-like, projecting outward are provided. At the right and left inner wall portions of the base pedestal 11, holes 13 and 13 are formed. They allow the rotary pivots 23 and 23 to rotatably fit thereto. By allowing the rotary pivots 23 and 23 of the terminal block 21 to rotatably fit into the holes 13 and 13 of the base pedestal 11, the terminal block 21 is assembled to the base pedestal 11 so as to be capable of swinging in the top-bottom directions.

The back supporter 26 serves as a backrest that supports the back of the PMP 6 mounted on the terminal block 21. At the relatively top portion on the front side thereof, a cushion member 26c is bonded. The bottom base 26b is fastened to boss portions 11b and 11b provided upright at the bottom of the base pedestal 11 with a use of screw members 28 and 28.

Between the back face of the terminal block 21 and the back face of the back supporter 26, a spring 29 that is, for example, coil-like, is attached. A body portion 29b of the spring 29 is attached to the back side of the terminal block 21, and a top end portion 29a of the spring 29 is engaged with a pin 26p that projects from the back face of the back supporter 26. To the terminal block 21, by the biasing operation of the spring 29, rotary force about the rotary pivots 23 and 23 in the direction in which the front portion of the terminal block 21 rotates upwardly is constantly applied. Accordingly, when the PMP 6 is mounted on the terminal block 21, the upper back face of the PMP 6 is pressed against the cushion member 26c bonded to the front surface of the back supporter 26, and the PMP 6 can be stably retained.

The drive side portion 16 that is integrally formed by the side of the base pedestal 11 (the right side in the drawings) is provided with an upper and a lower parallel grooves 16a and 16b that extend in the front and rear directions (the directions of arrows $Y_F$ and $Y_R$). The grooves 16a and 16b are open on their outer side (the right side in the drawings). At the relatively rear portion of the upper groove 16a, a cam-shaped portion 16c having an overhang portion that extends toward the outside and slope faces at the front and rear sides of the overhang portion is formed. The upper groove 16a is provided at the position that can engage with the tip portion of a first arm 57a of a switch lever 57 assembled into the driver unit 50, which will be described later.

At the central portion of the lower groove 16b in the front and rear directions, a rack gear 17 (a side rack gear) that can engage with a driving gear 76 (a second driving gear) assembled into the driver unit 50, as will be described later, is provided along the groove 16b. Accordingly, by the side rack gear 17 being driven in the front and rear directions (the directions of arrows $Y_F$ and $Y_R$) by the rotation of the second driving gear 76, the base pedestal 11 (hence the whole PMP retaining mechanism 10) is driven in the front and rear directions. It is to be noted that there are portions (notches) with no rack tooth in front and back of the side rack gear 17.

As described in the foregoing, the PMP retaining mechanism 10 is accommodated in the recess portion 3c that is recessed by a predetermined depth from the surface 3f of the front panel 3. In the state where the front side of the PMP reproduction unit U2 is covered by the slide door 30, the PMP retaining mechanism 10 is positioned on the deeper side than the slide door 30, that is, at the accommodation position on the rear side (in the arrow $Y_R$ direction). It is structured such that, in this state, the front side of the base pedestal 11 and the front side of the terminal block 21 are surely positioned on the rear side than the back side of the slide door 30, so that interference between them is surely avoided.

Further, it is structured such that, when the slide door 30 is moved to uncover the front side of the PMP retaining mechanism 10, in association with the moving operation of the slide door 30, the PMP retaining mechanism 10 is drawn from the accommodation position toward the front side (the arrow $Y_F$ direction), to arrive at the draw out position (see FIG. 1C). In this draw out state, it is set such that the supporting face (the front side) of the back supporter 26 is substantially flush with the surface 3f of the front panel 3, whereby attachment or removal of the PMP 6 to or from the PMP retaining mechanism 10 can be easily performed.

Figure 9A:
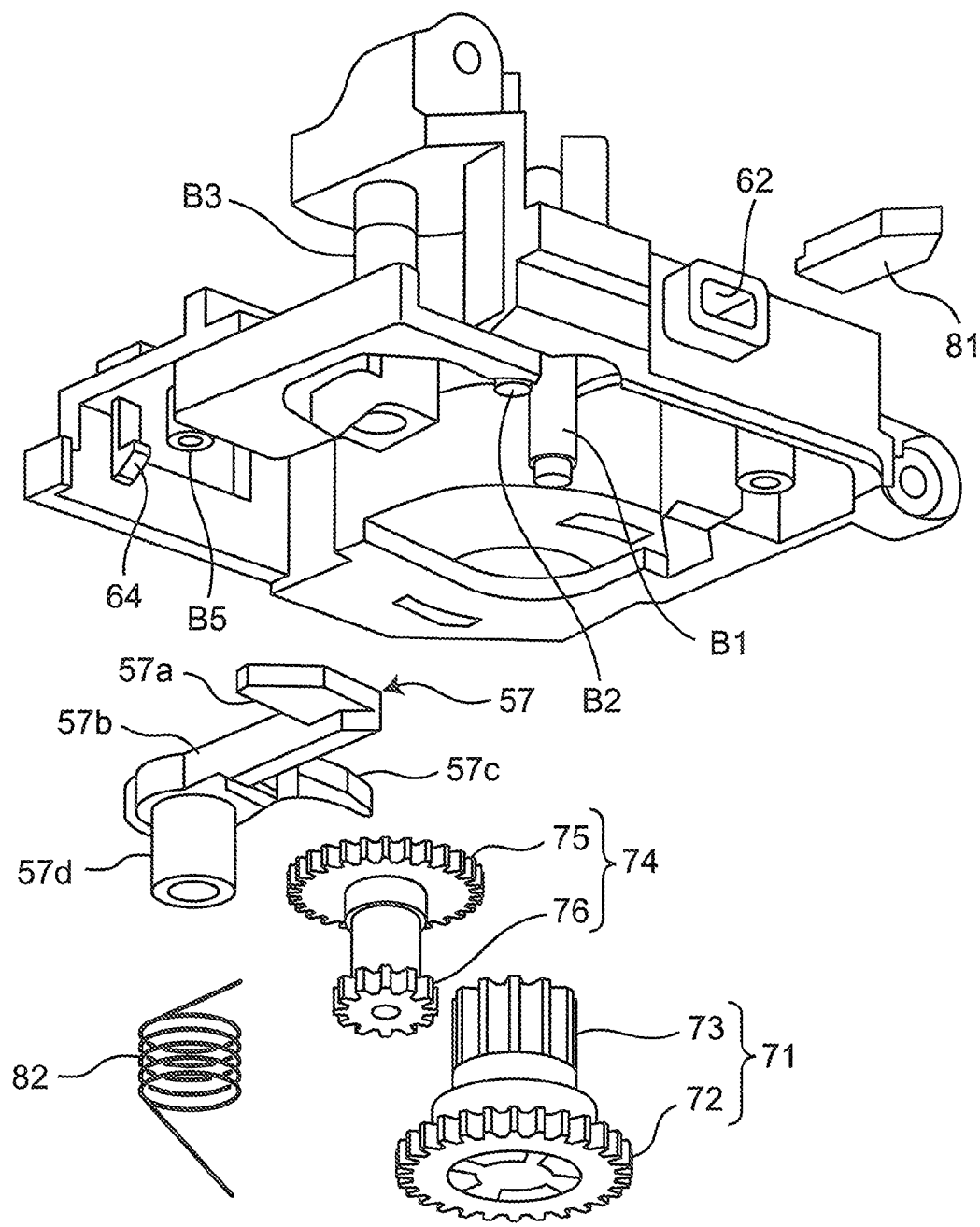
FIG. 9A is a perspective view as seen from diagonally below showing the schematic structure of the bottom side portion of the driver unit.
Figure 9B:
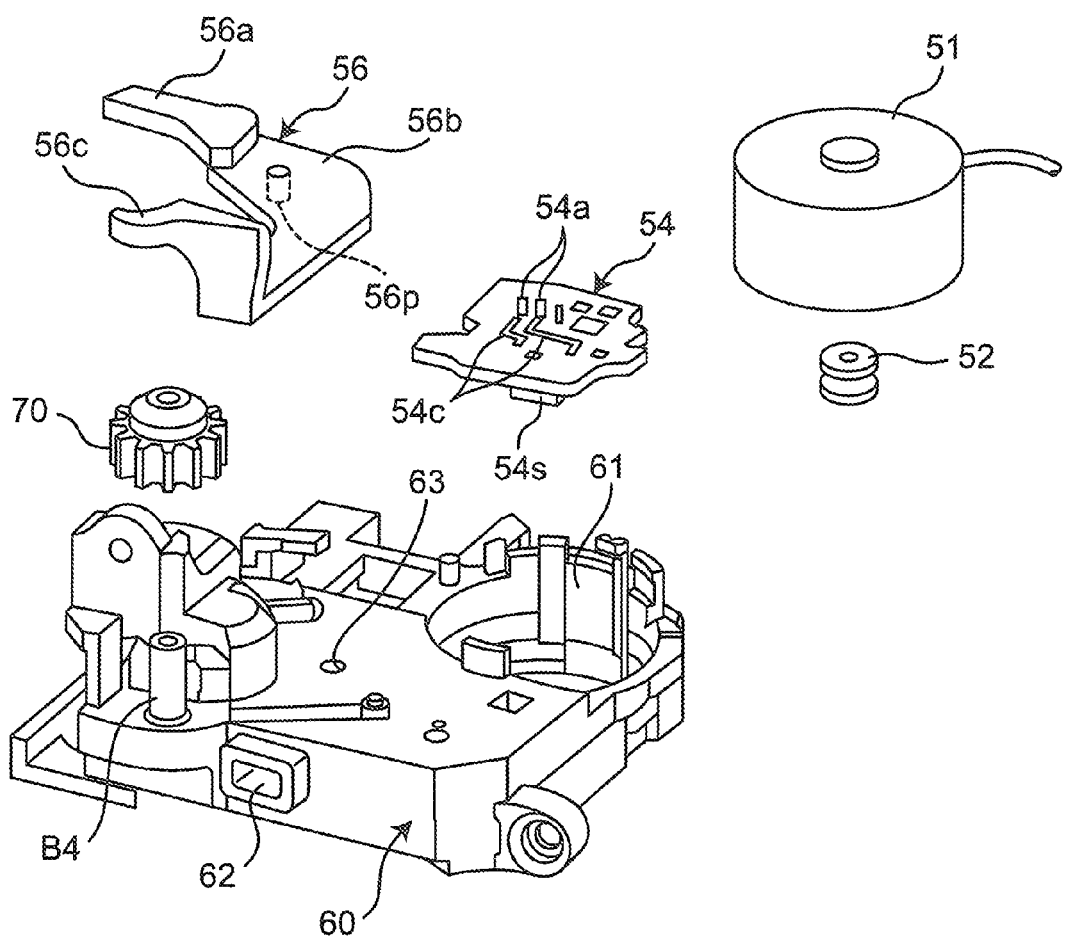
FIG. 9B is a perspective view as seen from diagonally above showing the schematic structure of the top side portion of the driver unit.
Figure 9C:
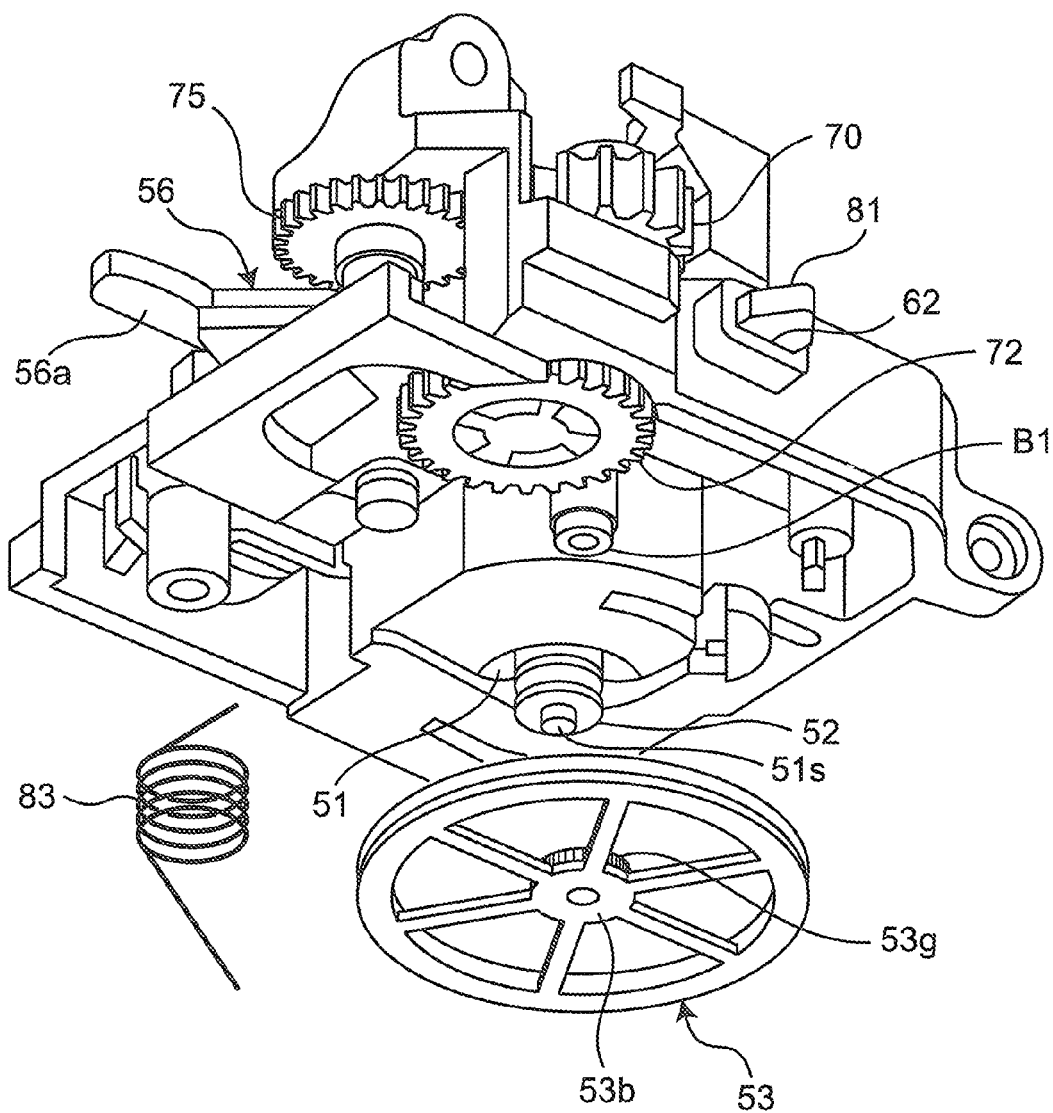
FIG. 9C is a perspective view as seen from diagonally below schematically showing the state of the driver unit before completely assembled.

Next, a description will be given of the driver unit 50. FIG. 9A is a perspective view as seen from diagonally below showing the schematic structure of the bottom side portion of the driver unit 50. FIG. 9B is a perspective view as seen from diagonally above showing the schematic structure of the top side portion of the driver unit 50. Further, FIG. 9C is a perspective view as seen from diagonally below showing the state of the driver unit 50 before assembly is completed.

As shown in the drawings, the driver unit 50 includes a base element (unit base) 60 into which basic constituents of the unit 50 are assembled. The unit base 60 whose overall shape is substantially square in planar view, and has assembly portions formed at its top, bottom, and side faces into which various constituents are assembled.

When the constituents are assembled into the unit base 60, for example, firstly, prescribed constituents are assembled into the bottom side of the unit base 60 (see FIG. 9A). Next, prescribed constituents are assembled on the top side of the unit base 60 (see FIG. 9B). Finally, assembly of the bottom side portion of the unit base 60 is performed (see FIG. 9C), to complete the assembly of the driver unit 50.

On the top side of the unit base 60, a concave portion 61 whose circumferential shape is formed to be a circular shape of a predetermined diameter (see FIG. 9B). In this concave portion 61, the electric motor 51 as the drive source is accommodated. Further, on the top side of the unit base 60, a printed circuit board 54 is assembled relatively near the electric motor 51. The printed circuit board 54 includes a connector 54a and a circuit portion 54c for exerting control and the like. On the bottom side of the printed circuit board 54, a position detection-purpose switch 54s is attached. This position detection switch 54s is to detect the state in which the PMP retaining mechanism 10 moves frontward (in the arrow $Y_F$ direction in FIGS. 1A to 1C and the like) to arrive at an advanced position by at least a certain degree. A detection signal is provided to the circuit portion 54c via the connector 54a. This position detection will be detailed later.

An output shaft 51s of the electric motor 51 projects from the bottom side of the unit base 60. A driving pulley 52 of a small diameter is coupled to the output shaft 51s (see FIG. 9C). This driving pulley 52 is linked to a driven pulley 53 of a large diameter via a transmission belt (not shown). This driven pulley 53 is rotatably supported by a boss portion B1 that is suspended from the unit base 60. The rotary force of the motor 51 is transmitted to the driven pulley 53, while the rotary speed of the motor 51 is decelerated in accordance with the diameter ratio between the driving pulley 52 and the driven pulley 53. At the top portion of a central boss portion 53b of the driven pulley 53, a gear portion 53g (a pulley gear) having a predetermined diameter is formed. This pulley gear 53g is provided with tooth along its outer circumference.

The pulley gear 53g of the driven pulley 53 meshes with an input gear 72 of a first gear set 71 which is structured by coaxial input gear 72 and output gear 73 arranged in an upper-lower direction (see FIG. 9A). This first gear set 71 is rotatably supported by a boss portion B2 that is suspended from the unit base 60. The input gear 72 of the first gear set 71 is designed to have a greater diameter than the pulley gear 53g. The rotary force of the motor 51 is transmitted to the first gear set 71, while the rotary speed of the motor 51 is further decelerated in accordance with the gear ratio between the input gear 72 and the pulley gear 53g.

The output gear 73 of the first gear set 71 is positioned on the top side of the unit base 60. The output gear 73 meshes with an input gear 75 of a second gear set 74, and at the same time, meshes with the driving gear 70 (the first driving gear) that can mesh with the driving rack gear 31 on the back side of the slide door 30. This first driving gear 70 is rotatably supported by the boss portion B4 (see FIG. 9B) provided upright on the unit base 60.

The second gear set 74 is arranged in parallel to the first gear set 71, and is structured by coaxial input gear 75 and output gear 76. The second gear set 74 is rotatably supported by a boss portion B3 (see FIG. 9A) that is arranged on the top side of the unit base 60. The output gear 76 of the second gear set 74 is smaller in diameter than the input gear 75, and located at a position in the upper-lower direction corresponding to the lower groove 16b of the drive side portion 16 in the PMP retaining mechanism 10. The output gear 76 can mesh with the side rack gear 17 formed in the lower groove 16b.

That is, the output gear 76 of the second gear set 74 functions as the driving gear (the second driving gear) that can mesh with the side rack gear 17 of the PMP retaining mechanism 10 to thereby drive the PMP retaining mechanism 10 in the front and rear directions (in the directions of arrows $Y_F$ and $Y_R$).

Here, with reference to FIGS. 9D to 9G, a description will be given of an assembly structure in which the rotary elements such as the driven pulley 53, the first gear set 71, the second gear set 74 and the like are assembled into the tip side of the boss portions B1, B2, and B3 as hollow shafts provided upright on the unit base (pedestal) 60 so as to be freely rotatable about the corresponding boss portions B1, B2, and B3.

Figure 9D:
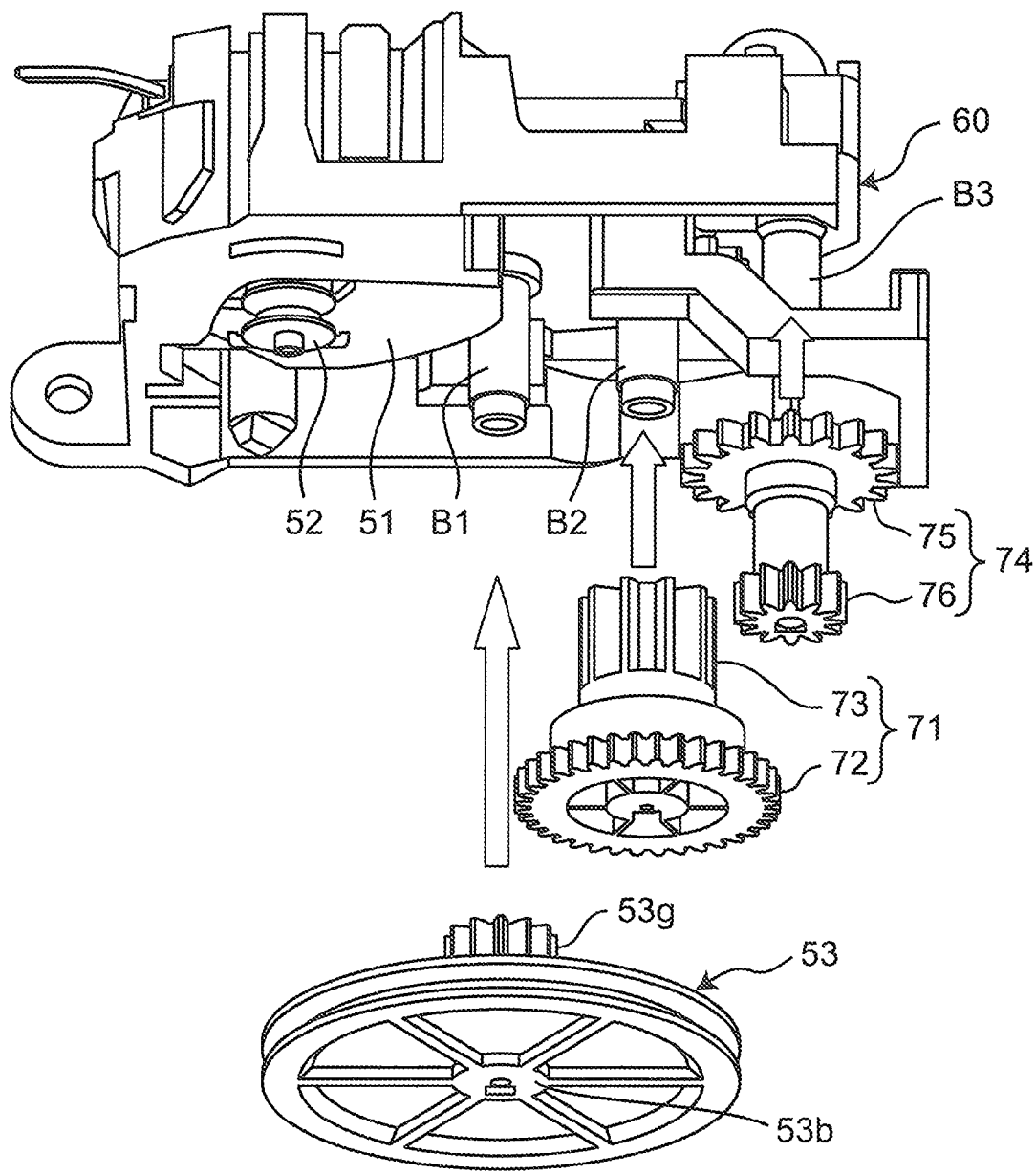
FIG. 9D is a perspective view as seen from diagonally below schematically showing the state of the driver unit before assembled.
Figure 9E:
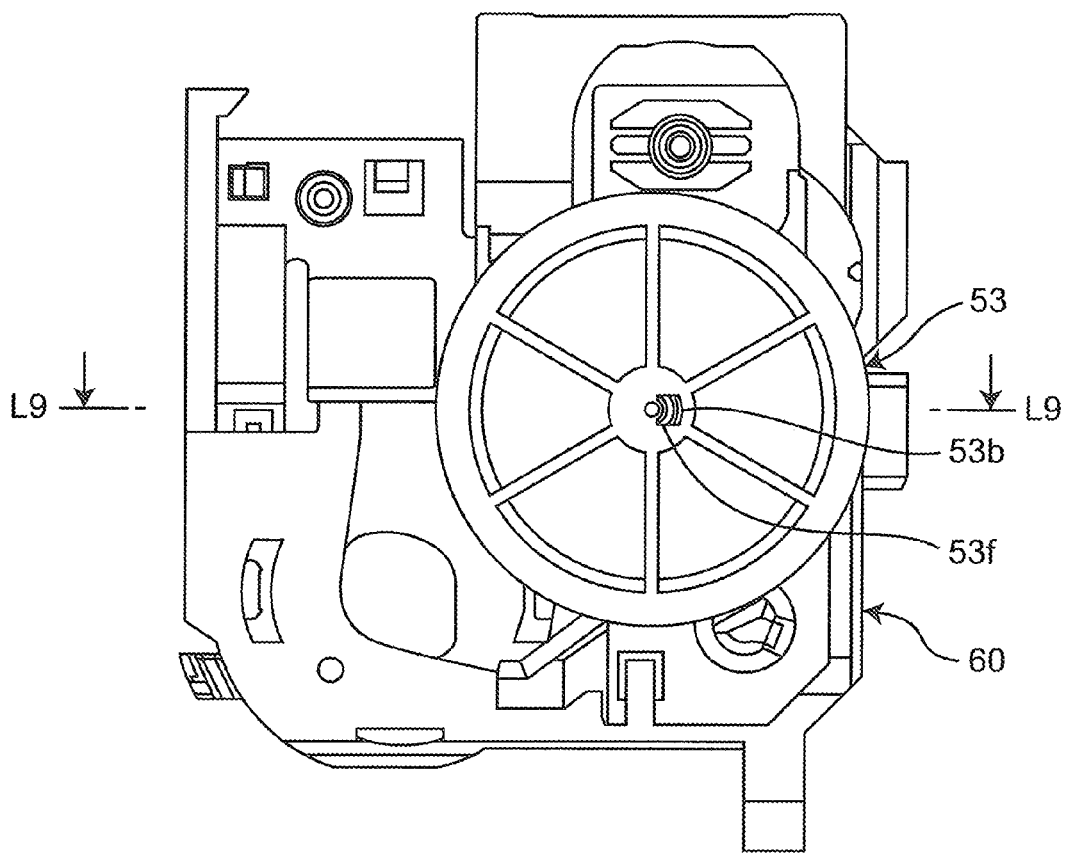
FIG. 9E is a bottom view schematically showing the state of a driven pulley before assembled into a boss portion.
Figure 9F:
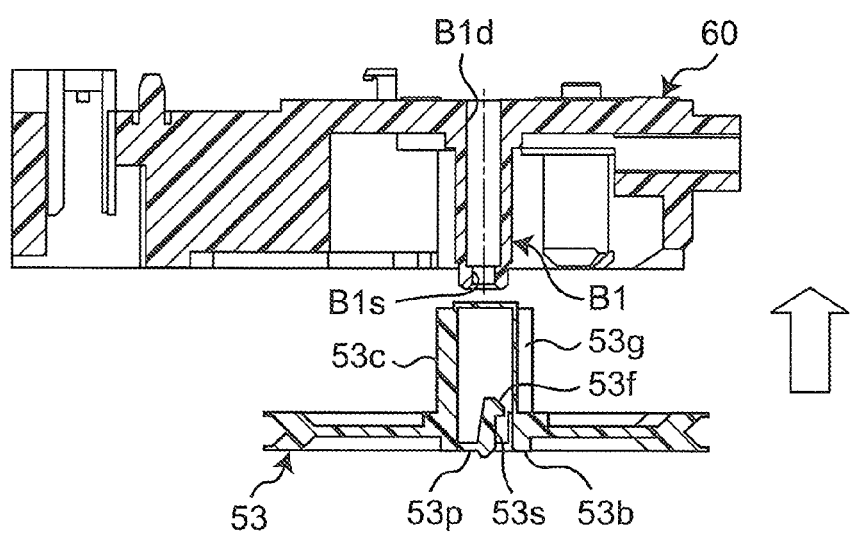
FIG. 9F is a schematic cross-sectional view of the driven pulley and the boss portion taken along a line L9-L9 in FIG. 9E.
Figure 9G:
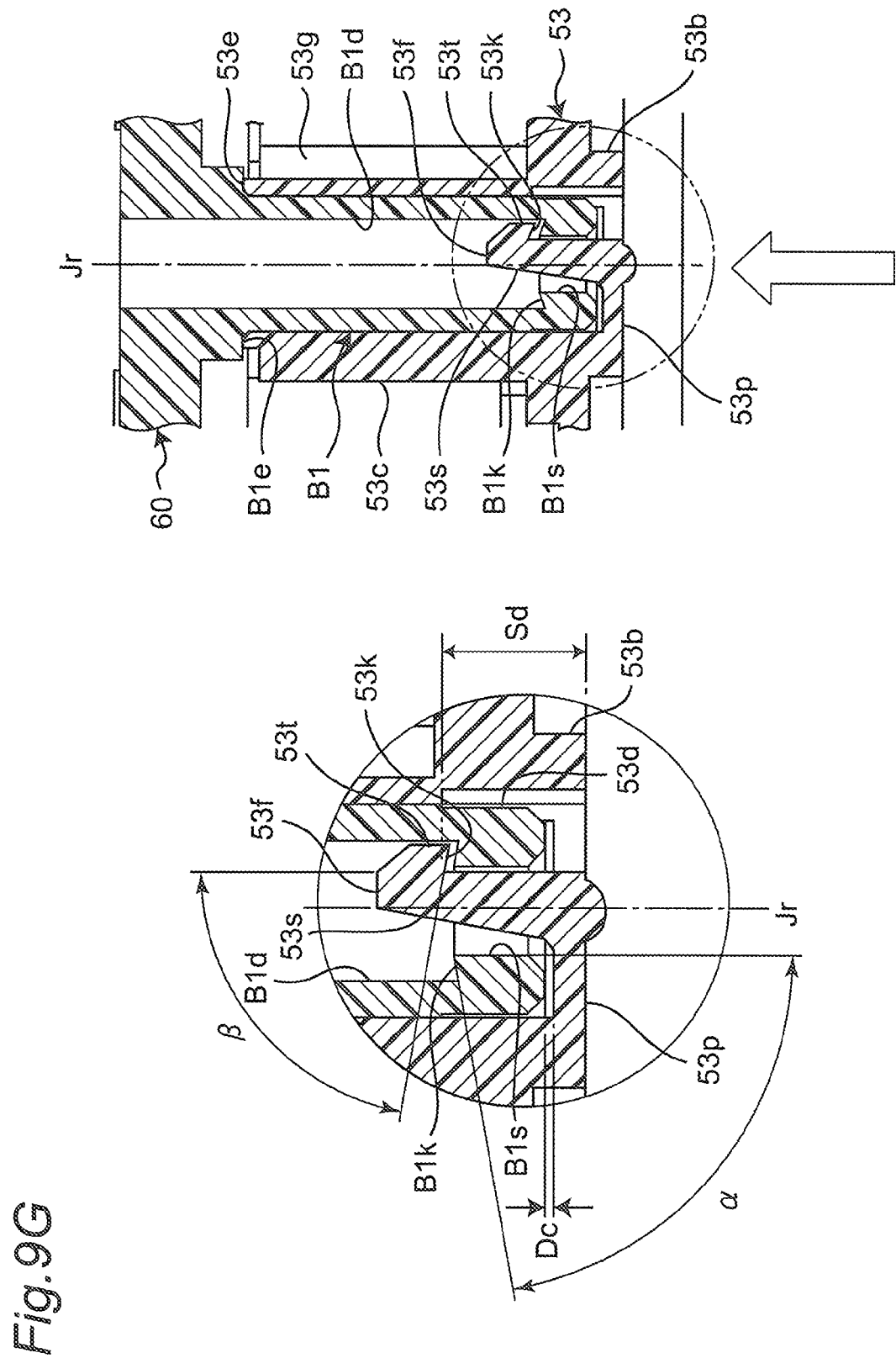
FIG. 9G is an enlarged cross-sectional view schematically showing the chief portion of the assembly structure of the driven pulley into the boss portion.

FIG. 9D is a perspective view as seen from diagonally below showing the state of the driver unit 50 before being assembled. FIG. 9E is a bottom view showing the state of the driven pulley 53 before being assembled into the boss portion. FIG. 9F is a cross-sectional view taken along a line L9-L9 in FIG. 9E. Further, FIG. 9G is a cross-sectional view showing the chief part of the assembly structure of the driven pulley 53 being assembled into the boss portion in an enlarged manner.

In the present embodiment, in rotatably assembling the rotary elements (the driven pulley 53, the first gear set 71, and the second gear set 74) to the tip side of the hollow shafts (the boss portions B1, B2, and B3), the rotary elements can be rotatably assembled to the tip side of the hollow shaft, without using any screw mechanism, and while surely preventing the rotary elements from coming off. The assembly structure of each of the three rotary elements (the driven pulley 53, the first gear set 71, and the second gear set 74) to the tip side of the hollow shafts (the boss portions B1, B2, and B3) is basically identical. Therefore, in the following, with reference chiefly to FIGS. 9E to 9G, a description will be given of the assembly structure in which the driven pulley 53 is assembled to the tip side of the boss portion B1, as representative example.

The boss portion B1 provided upright on the unit base 60 has a hollow structure. On the tip side, a small diameter portion B1s being smaller in diameter than a hollow portion B1d of the boss portion B1 is provided. It is to be noted that, in the present embodiment, the unit base 60 and the boss portion B1 formed integrally with the unit base 60 are obtained by molding process using synthetic resin as the material.

Further, the driven pulley 53 is also made of synthetic resin. A rotation center portion 53b of the driven pulley 53 is provided with a cylindrical portion 53c having an inner circumferential portion fitting to the outer circumferential portion of the boss portion B1. The pulley gear 53g is formed at the outer circumferential portion of this cylindrical portion 53c. Provided inside the cylindrical portion 53c is a hook strut portion 53s that has a hook portion 53f overhanging in the radial direction on the tip side thereof and that extends substantially along the fitting direction (see the outlined arrows in FIGS. 9D, 9F, and 9G) to the boss portion B1. The base end portion of the hook strut portion 53s and the base end portion of the cylindrical portion 53c are coupled with each other by a resin-made thin plate portion 53p. The center of the base end portion of the hook strut portion 53s is preferably positioned on the substantially center line Jr of the cylindrical portion 53c (substantively the rotation center line of the driven pulley 53). Further, the radius of the overhang tip portion 53t of the hook portion 53f is set to be greater than the radius of the small diameter portion B1s of the boss portion B1 and to be smaller than the radius of the hollow portion B1d.

Inside the boss portion B1, since the small diameter portion B1s smaller in diameter than the hollow portion B1d is provided on the tip side, a stepped portion B1k is formed by the hollow portion B1d and the small diameter portion B1s. The stepped portion B1k is preferably set such that the inner circumferential side is positioned on the fitting direction (see outlined arrows in FIGS. 9D, 9F, and 9G) side than the outer circumferential side, relative to the boss portion B1 of the cylindrical portion 53c.

For example, as shown in the partial enlarged view of FIG. 9G, by structuring the stepped portion B1k with a slope face, and setting this slope face to tilt by an angle α which is smaller than 90 degrees (e.g., α=80 degrees) with reference to the direction parallel to the rotation center line Jr, the inner circumferential side can be set to position on the fitting direction side than the outer circumferential side, relative to the boss portion B1 of the cylindrical portion 53c. Alternatively, it is also possible to structure the stepped portion B1k with a flat face that is substantially perpendicular to the direction parallel to the rotation center line Jr, and to form a protrusion at the inner circumferential portion of the flat face that protrudes by a prescribed amount in the fitting direction.

As will be described later, in the state where the driven pulley 53 is assembled into the boss portion B1, the hook portion 53f engages with the stepped portion B1k of the boss portion B1. More preferably, the engaging portion 53k with the stepped portion B1k is also set such that the inner side is positioned on the fitting direction (see outlined arrows in FIGS. 9D, 9F, and 9G) side than the outer side.

For example, as shown in the partial enlarged view in FIG. 9G, by structuring the engaging portion 53k with a slope face, and setting the slope face to tilt by an angle β which is smaller than 90 degrees (e.g., β=α=80 degrees) with reference to the direction parallel to the rotation center line Jr, the inner side can be set to position on the fitting direction side than the outer side, relative to the boss portion B1 of the cylindrical portion 53c. It is to be noted that, as to the magnitude relationship between angle β and angle α, when it is not β=α as described above, β<α is preferable than β>α. Further, instead of forming the engaging portion 53k with a slope face, it is also possible to structure the engaging portion 53k with a flat face that is substantially perpendicular to the direction parallel to the rotation center Jr, and to form a protrusion on the outer side of the flat face that protrudes by a prescribed amount in the direction opposite to the fitting direction.

When the driven pulley 53 is assembled to the tip side of the boss portion B1, by fitting the cylindrical portion 53c of the driven pulley 53 to the boss portion B1, the hook portion 53f on the tip side of the hook strut portion 53s is pressed into the hollow portion B1d via the small diameter portion B1s on the tip side of the boss portion B1, and the hook portion 53f engages with the stepped portion B1k formed by the hollow portion B1d and the small diameter portion B1s.

As has been described in the foregoing, the base end portion of the hook strut portion 53s of the driven pulley 53 and the base end portion of the cylindrical portion 53c is coupled with each other by the resin-made thin plate portion 53p. When the cylindrical portion 53c of the driven pulley 53 is fitted from the tip side of the boss portion B1, the hook portion 53f penetrates through the small diameter portion B1s while having its slope face on the tip side pressed by the small diameter portion B1s of the boss portion B1. Here, it is structured such that the thin plate portion 53p and the hook strut portion 53s appropriately bend so that the hook portion 53f can penetrate through the small diameter portion B1s without any trouble.

In the present embodiment, after the hook portion 53f of the driven pulley 53 is thus inserted to penetrate through the small diameter portion B1s of the boss portion B1, as described above, the hook portion 53f of the cylindrical portion 53c of the driven pulley 53 engages with the stepped portion B1k formed with the hollow portion B1d of the boss portion B1 and the small diameter portion B1s. This prevents the driven pulley 53 from coming off from the boss portion B1.

That is, in rotatably assembling the driven pulley 53 on the tip side of the boss portion B1, the driven pulley 53 can be rotatably assembled to the tip side of the boss portion B1 without using any screw mechanism and while surely preventing the driven pulley 53 from coming off. Thus, an improvement in workability in the assembly step and a reduction in the number of components can be achieved. Further, it becomes possible to eliminate occurrence of possible trouble such as bulge, crack, or breakage at the tip side of the boss portion B1 which may otherwise occur when a screw mechanism is used.

Here, as to the stepped portion B1k in the boss portion B1 with which the hook portion 53f of the driven pulley 53 engages, since the inner circumferential side positions on the fitting direction side than the outer circumferential side relative to the boss portion B1 of the cylindrical portion 53c, the engagement of the hook portion 53f with the stepped portion 53k will not be easily disengaged, and the effect of preventing the driven pulley 53 from coming off from the boss portion B1 is further improved.

Further, since the engaging portion 53k which engages with the stepped portion B1k of the hook portion 53f has its inner side positioned on the fitting direction side than the outer side, the engagement of the hook portion 53f with the stepped portion B1k will not be easily disengaged, and the effect of preventing the driven pulley 53 from coming off from the boss portion B1 is further enhanced.

In special, by structuring both the engaging portion 53k of the hook portion 53f with the stepped portion B1k and the stepped portion B1k as described in the foregoing, in the assembled state, a so-called "wedge structure" is formed between them. Therefore, disengagement will not easily occur.

Further, at the outer circumferential portion of the boss portion B1, an abutment receiving portion B1e is provided.

The abutment receiving portion B1e is to stop and receive a tip portion 53e of the cylindrical portion 53c when the cylindrical portion 53c of the driven pulley 53 is fitted. It is structured such that, when the driven pulley 53 is assembled to the tip side of the boss portion B1, in the state where the tip portion 53e of the cylindrical portion 53c abuts on and stopped by the abutment receiving portion B1e, a gap Dc (see the partial enlarged view of FIG. 9G) exists between the tip portion of the boss portion B1 and the thin plate portion 53p. The existence of the gap Dc ensures the free rotation of the driven pulley 53 about the tip side portion of the boss portion B1 with the simple structure.

In the present embodiment, further, at the outer circumferential portion on the tip side of the boss portion B1, a small diameter portion 53d whose outer diameter is set to be smaller by a prescribed amount is provided in a range Sd (see the partial enlarged view of FIG. 9G) that ranges from the tip of the boss portion B1 to the site corresponding to the portion positioned on the nearest fitting direction side in the engaging portion 53k of the hook portion 53f when the driven pulley 53 is assembled.

When the cylindrical portion 53c is molded by resin, it is necessary to use a mold for molding the inner circumferential portion of the cylindrical portion 53c and a mold for molding the hook portion 53f in combination. However, small resin burrs inevitably occur partially on the surface of the molded product at the corner portion where the molds are joined to each other. It is difficult to remove such burrs completely. Further, when the cylindrical portion 53c partially having such resin burrs on its inner circumference is fitted to the outer circumferential portion of the boss portion B1 and rotated, the partial resin burrs interfere with the surface of the outer circumferential portion of the boss portion B1 and the like in association with the rotation, and generally extraordinary noises or vibrations occur.

However, in the present embodiment, as described above, at the outer circumferential portion on the tip side of the boss portion B1, the small diameter portion 53d whose outer diameter is set to be smaller by a prescribed amount is provided in the range Sd that ranges from the tip of the boss portion B1 to the site corresponding to the position positioned on the nearest fitting direction side in the engaging portion 53k of the hook portion 53f when the driven pulley 53 is assembled. By setting the outer diameter of the small diameter portion 53d appropriately in accordance with the height of the resin burrs occurred at the inner circumferential portion of the cylindrical portion 53c, even in a case where partial resin burrs are present on the inner circumference of the cylindrical portion 53, interference between the resin burrs and the surface of the outer circumferential portion of the boss portion B1 and the like can be surely prevented.

The foregoing description with reference to FIGS. 9D to 9G has been given as to the case where the driven pulley 53 is assembled to the boss portion B1. However, the foregoing description can be effectively applied to the case where, for example, the first gear set 71 and the second gear set 74 are respectively assembled to the boss portions B2 and B3. Further, without being limited to these cases, the foregoing description can be effectively applied to other various cases where, in rotatably assembling the rotary elements to the tip side of the hollow shafts, the rotary elements are rotatably assembled to the tip side of the hollow shafts without using any screw mechanism and while surely preventing the rotary elements from coming off.

On the front side of the unit base 60, an opening portion 62 which is square shaped in a front view is formed. To the opening portion 62, a flat-plate like positioning piece 81 is inserted and accommodated therein. The positioning piece 81 has its tip portion triangularly shaped in a planar view. The tip portion can engage with the slope face portions of the cam grooves 33a and 33b formed on the back side of the slide door 30. With the rear end of the positioning piece 81, one end of a spring 82 (e.g., a helical spring: see FIG. 9A) is engaged. By the elastic force of the spring 82, the positioning piece 81 is constantly biased forward (in the arrow $Y_F$ direction). The positioning piece 81 is retained in the opening portion 62 so as to be capable of advancing and receding, with its tip portion projecting by a prescribed amount in the normal state.

Above the unit base 60, a lever member 56 (a switching lever) is arranged. The lever member 56 is integrally structured to include a plate-like body portion 56b (a lever body), a first arm 56a, and a second arm 56c. On the bottom side of the lever body 56b, a pin-like rotary strut 56p is provided to downwardly project. The rotary strut 56p is rotatably supported as being inserted inside the hole 63 on the top side of the unit base 60.

Below the unit base 60, a lever member 57 (a switch lever) is arranged. The lever member 57 is integrally structured to include a body portion 57b (a lever body) having a cylindrical portion 57d, a first arm 57a, and a second arm 57c. The cylindrical portion 57d of the lever body 57b is fitted into a boss portion B5 that suspends from the unit base 60 and rotatably supported thereby. Near the boss portion B5, a hook portion 64 is provided, and the hook portion 64 prevents the lever body 57b from coming off downward.

With the switch lever 57, one end of a spring 83 (e.g., a helical spring: see FIG. 9C) is engaged. By the elastic force of this spring 83, the switch lever 57 is constantly biased in a prescribed rotation direction. The tip portion of the first arm portion 57a of the switch lever 57 engages with the upper groove 16a of the drive side portion 16 of the PMP retaining mechanism 10, and abuts on the depth wall of the groove 16a with a prescribed biasing force.

Further, the other end of the spring 83 (a helical spring: see FIG. 9C) is engaged with the tip (the bottom end) of the rotary strut 56p of the switching lever 56. With this structure, the switching lever 56 is provided with the effect of preventing coming off, and the rotation biasing force is applied thereto.

Here, with reference chiefly to FIG. 9H, a description will be given of the structure for providing the switching lever 56 with the effect of preventing coming off by the spring 83 and applying the rotation biasing force thereto. FIG. 9H is a view showing the bottom end portion of the rotary strut 56p of the switching lever 56 in an enlarged manner, in which (a) is a perspective view of the bottom end portion of the rotary strut, (b) is a bottom view showing an engaged state of the spring end with the bottom end portion of the rotary strut, and (c) is a side view showing an engaged state of the spring end with the bottom end portion of the rotary strut.

Into the hole 63 provided at the top of the unit base 60, the rotary strut 56p of the switching lever 56 is rotatably inserted. The switching lever 56 is preferably made of synthetic resin, and the rotary strut 56p is more preferably integrally molded with the switching lever 56. The rotary strut 56p is formed in a hollow cylindrical shape. At the bottom end thereof, an engaging portion 56e with which the other end of the spring 83 (the helical spring) is engaged is provided.

The engaging portion 56e is formed to be groove-like whose one direction (the opposite direction of the vertical wall 56h) being made open, with: a receiving face (a spring receiving face) 56f that is substantially perpendicular in the longitudinal direction of the rotary strut 56p; an engaging piece (a spring engaging piece) 56g that is arranged oppositely and substantially in parallel to the spring receiving face 56f at the end portion of the rotary strut 56p; and a vertical wall 56h that bridges between the spring engaging piece 56g and the spring receiving face 56f to couple them. It is to be noted that, the outer circumferential portion of the spring engaging piece 56g structures a part of the circle that is coaxial with a hollow portion 56t of the rotary strut 56p, and the diameter is set to be smaller than the inner diameter of the hollow portion 56t.

In assembling one end 83b of the spring (helical spring) 83 that can apply the rotation biasing force to the switching lever 56 into the bottom end portion of the rotary strut 56p of the switching lever 56, by causing the one end 83b of the spring 83 to engage with the groove-like engaging portion 56e from the direction opposing to the vertical wall 56h, the top and bottom of the one end 83b of the spring 83 are received by the spring receiving face 56f and the spring engaging piece 56g, and the side thereof is received by the vertical wall 56h.

In this manner, in the present embodiment, by causing the one end 83b of the spring 83 to engage with the engaging portion 56e, the action of the one end 83b of the spring 83 and the spring receiving face 56f surely prevents the rotary strut 56p from coming off downward (upward in FIG. 9B). Further, by the one end 83b of the spring 83, the rotation biasing force can be applied to the rotary strut 56p via the vertical wall 56. That is, with one spring 83, it becomes possible to apply the rotation biasing force to the switching lever 56 and the effect of preventing coming off can be provided thereto. Thus, simplification of structure and space saving can be realized.

Further, as described in the foregoing, the outer circumferential portion of the spring engaging piece 56g structures a part of the circle that is coaxial with the hollow portion 56t of the rotary strut 56p, and the diameter thereof is set to be smaller than the inner diameter of the hollow portion 56t. Accordingly, when the switching lever 56 is molded with resin, it is not necessary to apply a complicated structure such as a slide core to the mold used for molding the rotary strut 56p. That is, in providing the spring engaging piece 56g as the overhang portion to the end portion of the rotary strut 56p, the diameter of the spring engaging piece 56g is set such that it falls within the diameter range of the hollow portion 56t of the rotary strut 56p, the mold structure can be simplified.

When the PMP retaining mechanism 10 moves forward (in the arrow $Y_F$ direction in FIGS. 1A to 1C) and the tip portion of the first arm portion 57a of the switch lever 57 sits on and along the cam-shaped portion 16c formed at the relatively rear portion of the upper groove 16a, the switch lever 57 rotates in the counterclockwise direction (the CCW direction) in a planar view against the biasing force of the spring 83. Thus, the tip portion of the second arm portion 57c of the switch lever 57 abuts on the position detection switch 54s of the printed circuit board 54 to thereby turn the switch 54s ON. This ON signal is input to the circuit portion 54c of the printed circuit board 54 via the connector 54a. In this manner, the position detection switch 54s operates in association with the operation of the switch lever 57. Thus, the position detection switch 54s realizes detection that the PMP retaining mechanism 10 moves forward, i.e., particularly that it is at the draw out position.

Figure 10B:
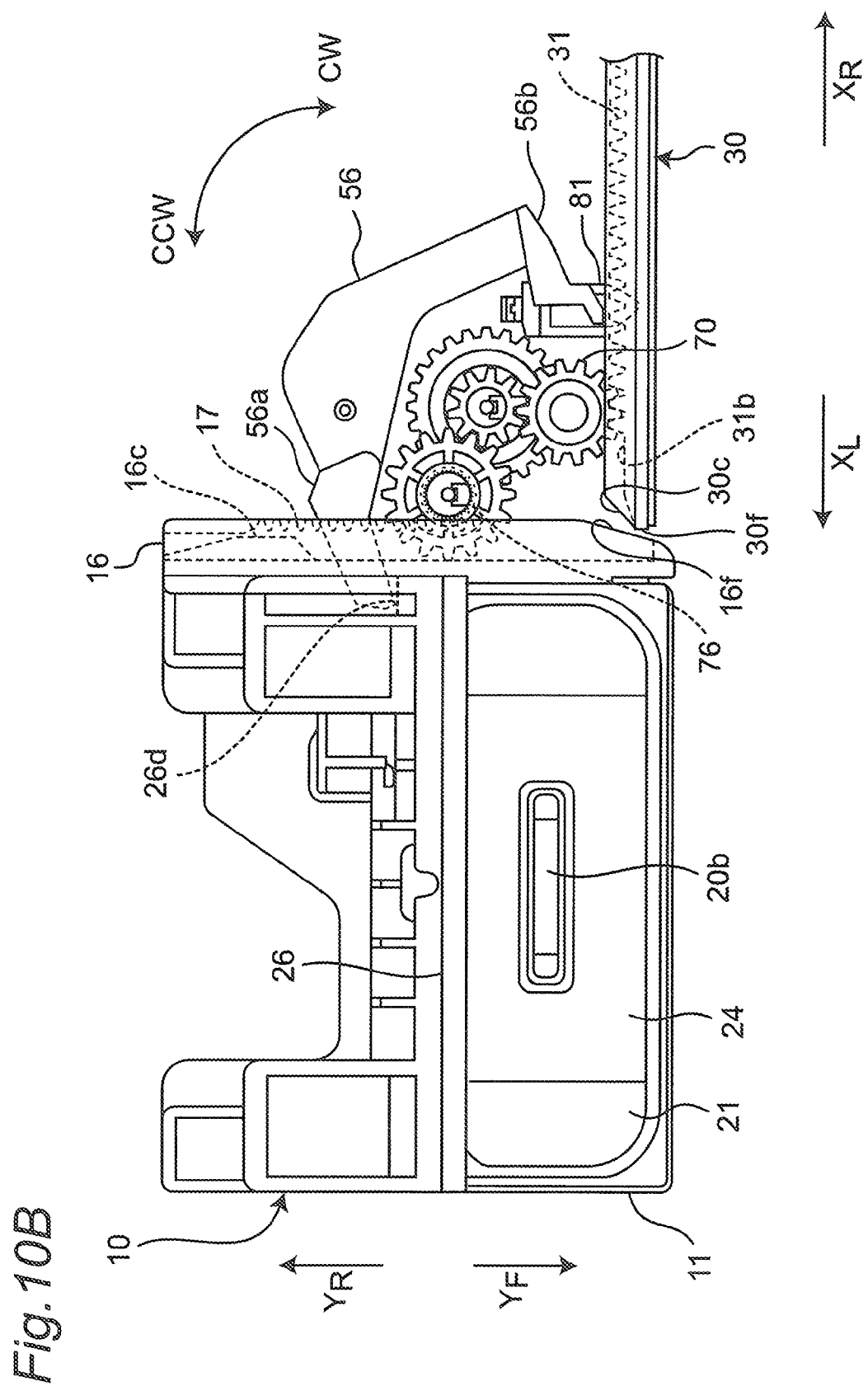
FIG. 10B is a plan view showing the positional relationship and the moving operation among the PMP retaining mechanism, the driver unit, and the slide door, in an initial state where the front side of the PMP retaining mechanism is open and the PMP retaining mechanism advances.
Figure 10C:
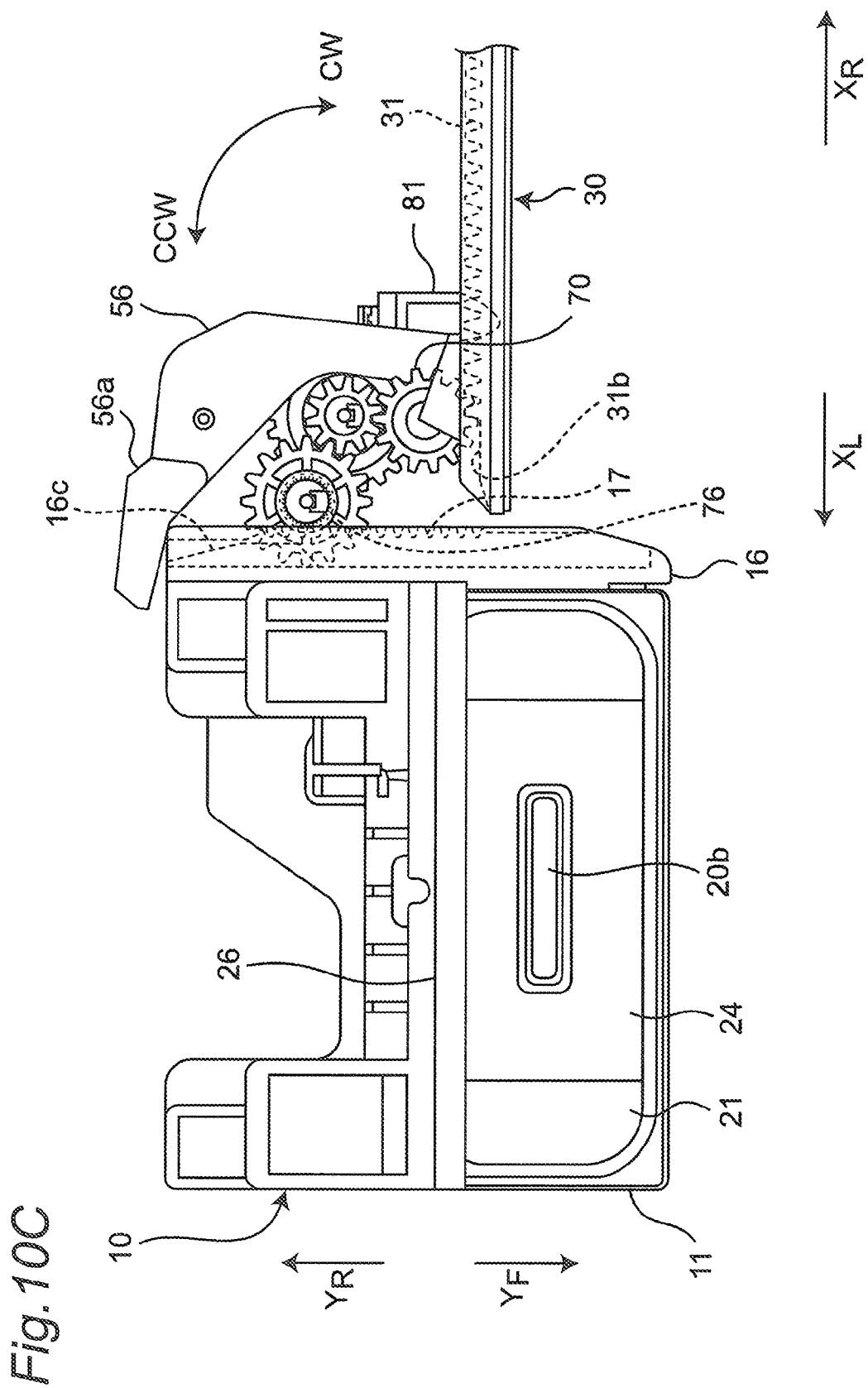
FIG. 10C is a plan view showing the positional relationship and the moving operation among the PMP retaining mechanism, the driver unit, and the slide door, in a state where the PMP retaining mechanism advances to the draw out position.

Next, with reference chiefly to FIGS. 10A to 10D, a description will be given of the front and rear direction operation of the PMP retaining mechanism 10. FIGS. 10A to 10D are each a plan view schematically showing the positional relationship and the moving operation of the PMP retaining mechanism 10, the driver unit 50, and the slide door 30. FIG. 10A shows the state where the front side of the PMP retaining mechanism 10 is closed by the slide door 30. FIG. 10B shows the initial state where the front side of the PMP retaining mechanism 10 is opened and the PMP retaining mechanism 10 advances. FIG. 10C shows the state where the PMP retaining mechanism 10 has advanced to arrive at the draw out position. FIG. 10D shows the state where the PMP retaining mechanism 10 recedes and before the front side thereof is closed by the slide door 30.

As shown in FIG. 10A, in a state where the front side of the PMP retaining mechanism 10 is closed by the slide door 30, when the first driving gear 70 rotates in the counterclockwise direction (the CCW direction), the first driving gear 70 meshes with the driving rack gear 31 of the slide door 30 via the idle rack gear 42, to press the positioning piece 81 rearward (the arrow $Y_R$ direction) along the slope face of the cam groove 33a of the slide door 30 against the biasing force of the spring 82. This causes the slide door 30 to move to the right side (in the arrow $X_R$ direction). When the slide door 30 further continuously moves in the right direction, the abutting face 32c (see FIGS. 4A and 4D) near the left end of the slide door 30 abuts on the tip portion of the second arm 56c of the switching lever 56. This causes the switching lever to rotate in the counterclockwise direction (the CCW direction).

When the first driving gear 70 is further rotated, the slide door 30 moves to the right side (in the arrow $X_R$ direction) until the first driving gear 70 passes over the terminal teeth of the driving rack gear 31 of the slide door 30 to correspond to the left end notch 31b, and the first driving gear 70 and the driving rack gear 31 become out of mesh.

Here, the tip portion of the first arm portion 56a of the switching lever 56 presses the prescribed portion 26d on the back side of the back supporter 26 of the PMP retaining mechanism 10 frontward (in the arrow $Y_F$ direction). Thus, the PMP retaining mechanism 10 is pushed forward, and as shown in FIG. 10B, the side rack gear 17 of the drive side portion 16 of the PMP retaining mechanism 10 meshes with the second driving gear 76.

When the electric motor 51 is further continuously rotated, since the second driving gear 76 meshes with the side rack gear 17, the drive side portion 16 (hence, the whole PMP retaining mechanism 10) is pushed forward, and brought to the advanced position.

At this time, the tip portion of the first arm 57a of the switch lever 57 abuts on the front slope face of the cam-shaped portion 16c of the upper groove 16a of the drive side portion 16 of the PMP retaining mechanism 10 and sits thereon. This causes the switch lever 57 to rotate in the counterclockwise direction (the CCW direction). In accordance therewith, the second arm portion 17c actuates the position detection-purpose switch 54s attached to the printed circuit board 54, to thereby stop the rotation of the electric motor 51 and secure the advanced position of the PMP retaining mechanism 10.

Further, it is structured such that, at this time, a slope face portion 16f provided on the front side of the drive side portion 16 causes a left end face 30f of the slide door 30 to further move to the right side (in the arrow $X_R$ direction) along the slope, the left end face 30f being out of mesh with the first driving gear 70 and in the stopped state, and whereby the gears more surely become out of mesh.

FIG. 10C shows the advance complete state (the draw out state) of the PMP retaining mechanism 10. It is structured such that, in this state, even if the slide door 30 is intentionally pushed to the left side (in the arrow $X_L$ direction), the left end face 30f of the slide door 30 abuts on and stopped by the outer side face of the drive side portion 16, and whereby a gap between the first driving gear 70 and the terminal teeth of the driving rack gear 31 of the slide door 30 is secured, and gears will not mesh with each other.

In the state where the PMP retaining mechanism 10 is at the advance complete position (the draw out position), the electric motor 51 is reversely rotated, to rotate the second driving gear 76 in the clockwise direction (the CW direction), the side rack gear 17 moves rearward (in the arrow $Y_R$ direction), and hence the PMP retaining mechanism 10 recedes. In accordance with the receding operation of the PMP retaining mechanism 10, the prescribed portion 26d on the back side of the back supporter 26 abuts on the tip portion of the first arm 56a of the switching lever 56, and rotates the switching lever 56 in the clockwise direction (the CW direction).

Thus, the tip portion of the second arm 56c of the switching lever 56 presses the abutting face 32c of the slide door 30 to the left side (in the arrow $X_L$ direction), and as shown in FIG. 10D, the first driving gear 70 and the driving rack gear 31 of the slide door 30 mesh with each other. When the electric motor 51 is further continuously rotated to cause the first driving gear 70 to rotate in the clockwise direction (the CW direction), the slide door 30 further moves to the left side (in the arrow $X_L$ direction).

After the first driving gear 70 and the driving rack gear 31 of the slide door 30 mesh with each other, the second driving gear 76 still continues to rotate. However, as the PMP retaining mechanism 10 recedes, the second driving gear 76 and the side rack gear 17 of the PMP retaining mechanism 10 become out of mesh.

It is structured such that, in this state, as the tip portion of the first arm portion 57a of the switch lever 57 having been sitting on the cam-shaped portion 16c of the upper groove 16a of the drive side portion 16 of the PMP retaining mechanism 10 abuts on the front slope face of the cam-shaped portion 16c. Further, the drive side portion 16 (hence, the whole PMP retaining mechanism 10) is pushed and moves rearward (in the arrow $Y_R$ direction) by the biasing force of the spring 83 acting on the switch lever 57.

It is structured such that, further continuous rotation of the electric motor 51 causes the slide door 30 to further move to the left side (in the arrow $X_L$ direction); and that the slope face 30c provided on the left end face side of the back side of the slide door 30 causes the right end front face of the PMP retaining mechanism 10 which is out of mesh with the second driving gear 76 and stopped to further move rearward (in the arrow $Y_R$ direction) along the slope, such that the gears become out of mesh more surely. Further continuous rotation of the electric motor 51 brings the slide door 30 to the position where the front side of the PMP retaining mechanism 10 at the recede position is closed (see FIG. 10A).

As has been described in the foregoing, according to the present embodiment, in connection with the music reproduction apparatus 1 capable of addressing reproduction of two types of external audio sources, i.e., the CD 5 and the PMP 6, the PMP retaining mechanism 10 that is at the accommodation position on the deeper side of the slide door 30 in the state being covered by the slide door 30 can be automatically moved between the accommodation position and the draw out position in accordance with the opening-closing state of the slide door 30, without the necessity for the user to perform troublesome manual operation. Thus, the operability of the apparatus 1 can be improved. Further, interference between the slide door 30 and the PMP retaining mechanism 10 can be surely prevented when the slide door 30 is operated to open and close.

In particular, in the present embodiment, provision of the switching lever 56 that selectively and substantially continuously switches and transmits the drive force from the single electric motor 51 as a drive source between the power transmission path for moving the slide door 30 and the power transmission path for moving the PMP retaining mechanism 10 allows the slide door 30 and the PMP retaining mechanism 10 to move with the single drive source (the electric motor 51) without any trouble, even in the case where the moving direction of the slide door 30 and the moving direction of the PMP retaining mechanism 10 are substantially perpendicular to each other.

With the music reproduction apparatus 1 according to the present embodiment, as can be clearly seen from FIGS. 1A to 1C, the front panel 3 is substantially vertically supported. Accordingly, the CD reproduction unit U1 that performs music reproduction using the compact disc (CD) 5 as an external audio source is used as a so-called upright type disc apparatus.

Generally, with such an upright type disc apparatus (CD reproduction unit) U1, when attaching or removing the disc 5 to or from the turn table 8 that rotatably supports the disc (CD) 5, the user must perform the attaching or removing work carefully so as not to drop the CD 5 often using both the hands. This requires the user to perform troublesome work.

The turn table 8 normally clamps a central hole 5h of the disc 5 by three nails that are called the "nail clamps" and that are provided at a central boss portion 8b of the turn table 8, to thereby surely transmit the rotary force of the motor 7 to the disc 5. Accordingly, when the disc 5 is to be attached to the turn table 8, the following work becomes necessary: centering the central hole 5h of the disc 5 relative to the central boss portion 8b of the turn table 8 and fitting the disc 5 thereto; and pressing the disc 5 to apply force of pressing the clamp nails. Since this work must be performed in the substantially perpendicular direction, it has never been an easy work for the user.

Therefore, in the present embodiment, in connection with the upright type disc apparatus U1, workability of attaching or removing the disc 5 to or from the turn table 8 can be enhanced. In the following, with reference to FIGS. 11A to 11D, a description will be given of the structure for improving attachment performance of the disc 5.

Figure 11A:
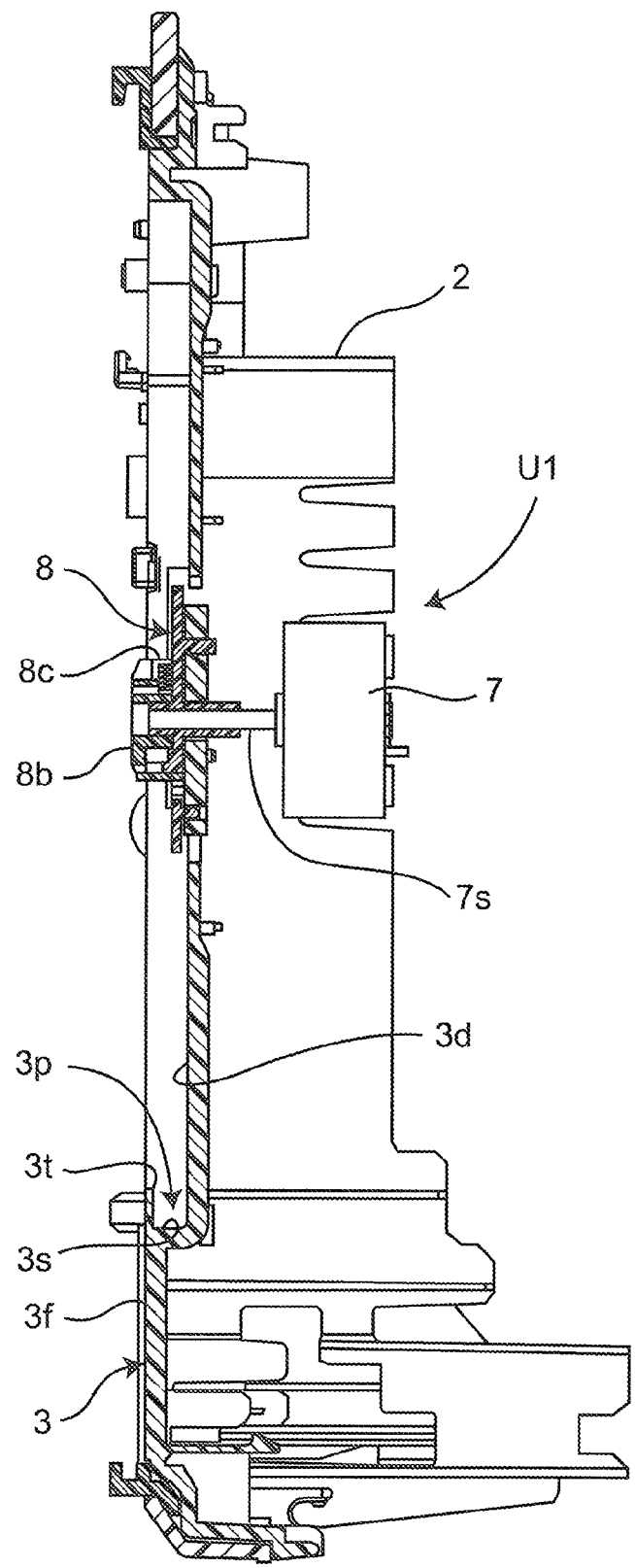
FIG. 11A is a schematic cross-sectional view of a CD reproduction unit taken along a line L11-L11 in FIG. 2.
Figure 11B:
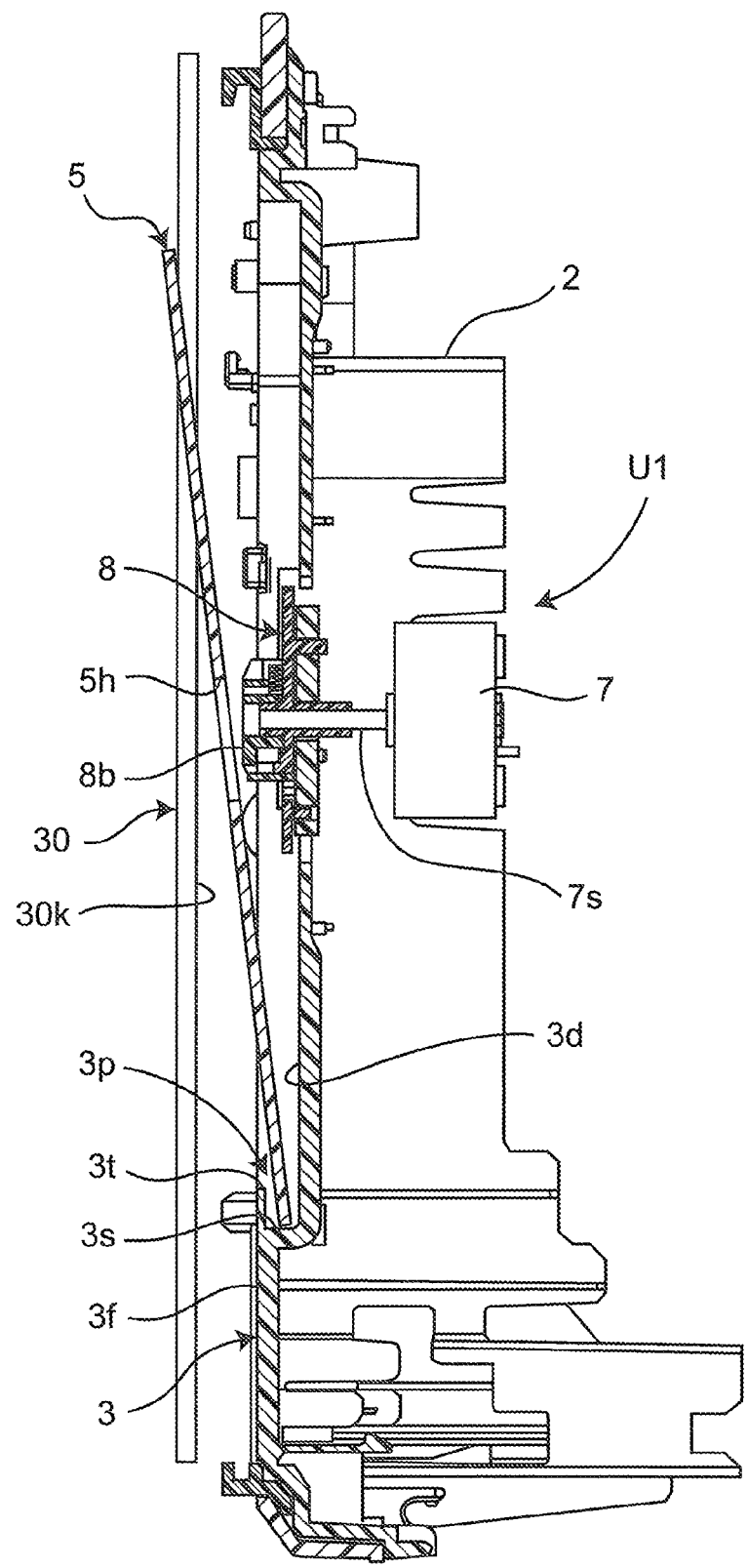
FIG. 11B is a cross-sectional view similar to FIG. 11A, showing a state during attachment of a disc.
Figure 11C:
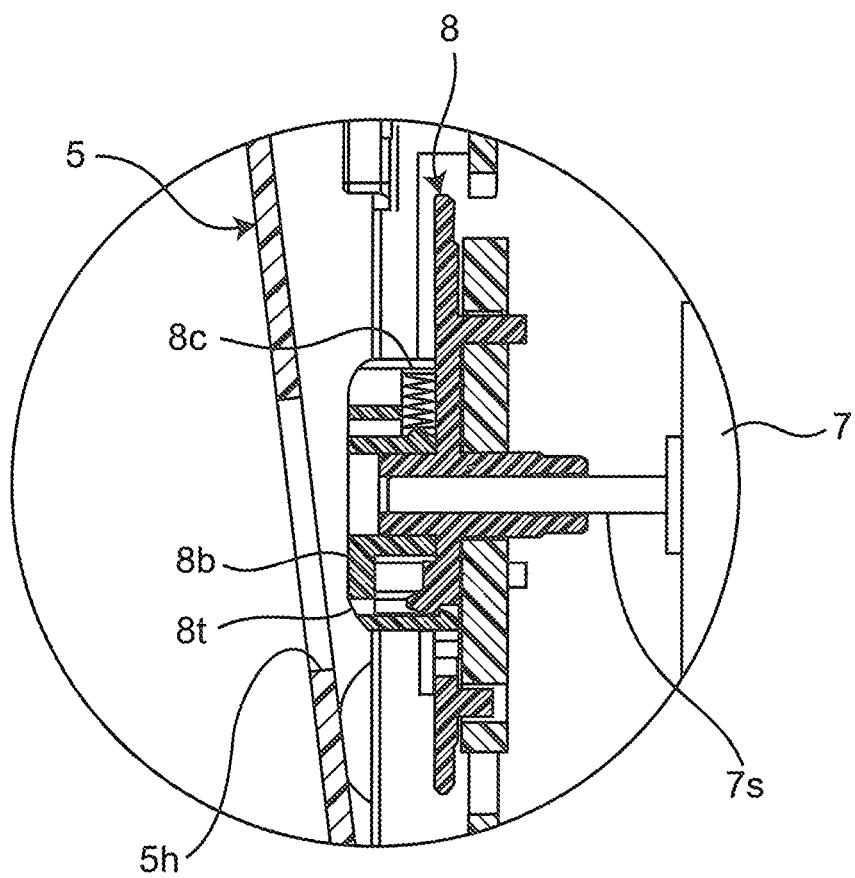
FIG. 11C is an enlarged cross-sectional view showing the chief portion of FIG. 11B.
Figure 11D:
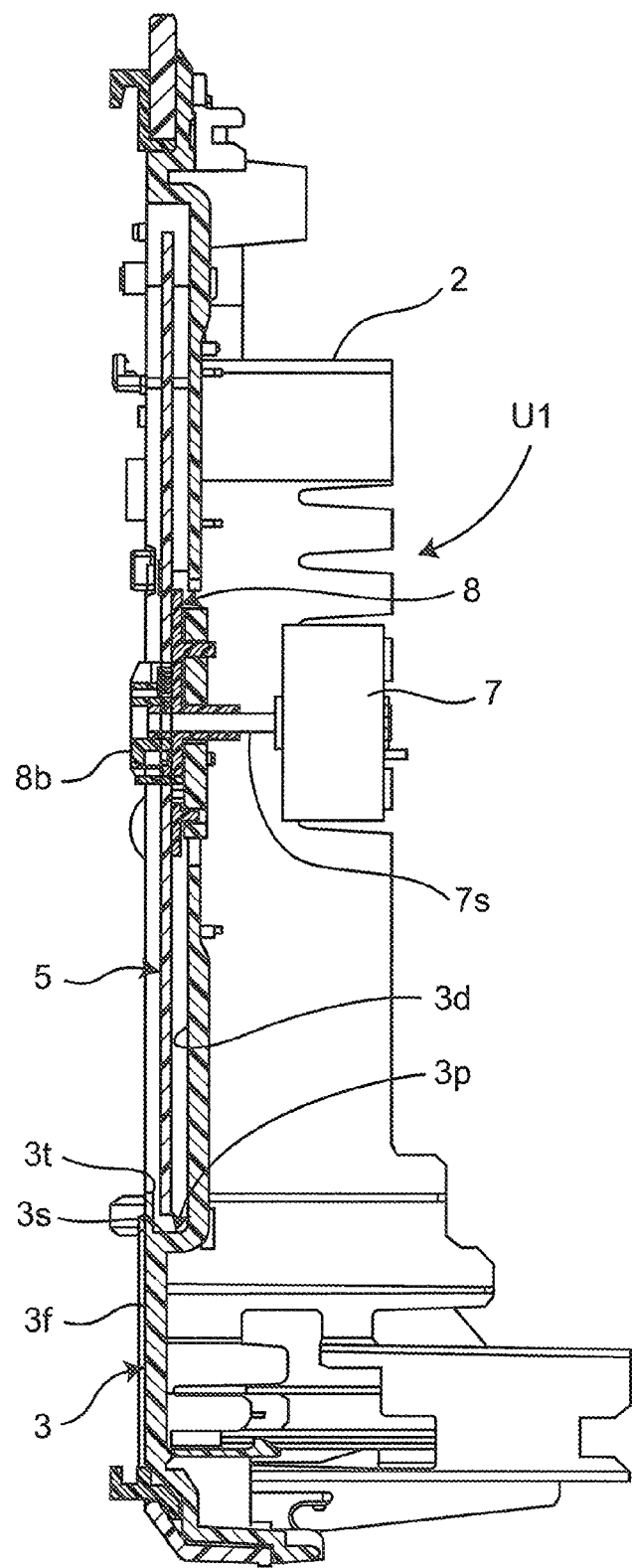
FIG. 11D is a cross-sectional view similar to FIG. 11A, showing a disc attachment complete state.

FIG. 11A is a schematic cross-sectional view of the disc apparatus (CD reproduction unit) U1 taken along a line L11-L11 in FIG. 2. Further, FIG. 11B is a cross-sectional view which is similar to FIG. 11A, showing the state during attachment of the disc. Still further, FIG. 11C is a chief portion enlarged cross-sectional view showing the chief part of FIG. 11B in an enlarged manner. Still further, FIG. 11D is a cross-sectional view which is similar to FIG. 11A, showing the disc attachment complete state.

In connection with the upright type disc apparatus (CD reproduction unit) U1 according to the present embodiment, in the front panel 3 at the region corresponding to the disc apparatus U1, a step-down face 3d for accommodating the disc (CD) 5 is formed as being stepped down by a prescribed amount (a slight amount) from the surface 3f. The turn table 8 is attached using this step-down face 3d as the base face. The turn table 8 is fixed to an output shaft 7s of the motor 7 arranged in the outer case 2 on the back side of the front panel 3. The turn table 8 is provided with the boss portion 8b at its center for fitting the central hole 5h of the disc 5 thereinto. To this central boss portion 8b, three well-known nail clamps 8c are mounted.

In the present embodiment, in the region corresponding to the bottom end portion of the step-down face 3d, a pocket portion 3p that can accommodate the bottom end portion of the disc 5 is formed. The pocket portion 3p is formed with the step-down face 3d in the region corresponding to the bottom end portion, a stepped wall 3s that bridges and couples the surface 3f of the front panel 3 and the step-down face 3d at the bottom end portion, and a vertical wall 3t that is formed to rise from the front edge of the stepped wall 3s by a prescribed height.

The pocket portion 3p is set such that, in the state where the bottom end portion of the disc 5 is accommodated, at least a part of the tip portion of the central boss portion 8b of the turn table 8 is in the inner circumferential range of the central hole 5h of the disc 5.

With this structure, in the upright type disc apparatus U1, provision of the pocket portion 3p that can accommodate the bottom end portion of the disc 5 at the bottom end portion of the step-down face 3d where the turn table 8 is arranged allows the user to tentatively place the disc 5 in the state where the bottom end portion of the disc 5 is accommodated in the pocket portion 3p when the disc 5 is to be attached or removed to or from the turn table 8. This largely improves convenience and workability. Further, since the pocket portion 3p is set such that at least a part of the tip portion of the central boss portion 8b of the turn table 8 is in the inner circumferential range of the central hole 5h of the disc 5 in the state where the bottom end portion of the disc 5 is accommodated, the work of centering the central hole 5h of the disc 5 to the central boss portion 8b of the turn table 8 can be made more easier when the disc 5 is to be attached to the turn table 8.

That is, in the present embodiment, the work to be done is divided into: the tentative-placement work of accommodating the bottom end portion of the disc 5 in the pocket portion 3p; and the work of pressing the disc 5 against the turn table 8 to press in the clamp nails 8c. In the aforementioned tentative-placement state, when the user again presses the disc 5 toward the turn table 8 side, a taper face 8t provided at the circumference of the tip of the central boss portion 8b of the turn table 8 guides and centers the central hole 5h of the disc 5. Thus, as shown in FIG. 11D, in the state where an appropriate gap is secured around the disc 5, the disc 5 can be rotated and attachment of the disc 5 is easily realized without the risk of dropping the disc or the like.

Further, more preferably in this case, it is set such that, as to the case where the slide door 30 opens the front side of the turn table 8, in the state where the bottom end portion of the disc 5 is accommodated in the pocket portion 3p and a part of the inner wall 30k of the slide door 30 supports the side of the corresponding portion of the disc 5, at least a part of the tip portion of the central boss portion 8b of the turn table 8 is in the inner circumferential range of the central hole 5h of the disc 5.

With this structure, when the disc 5 is to be attached or removed to or from the turn table 8, in the state where the disc 5 is supported at its bottom end portion by the pocket portion 3p and a part of the side face of the disc 5 is supported by a part of the inner wall 30k of the slide door 30, the disc 5 can be more surely tentatively placed.

It goes without saying that the present invention is not limited to the embodiment described above, and various improvements or changes in terms of design can be made without departing from the scope of the invention.

INDUSTRIAL APPLICABILITY

The present invention is useful as a rotary element assembly structure in which a rotary element is assembled to the tip side of a hollow shaft provided to stand upright on a pedestal. Further, the present invention is useful as an upright type disc apparatus with which workability in attaching or removing a disc is enhanced.

EXPLANATION OF REFERENCE SYMBOLS

1 MUSIC REPRODUCTION APPARATUS
3 FRONT PANEL
3d STEP-DOWN FACE
3f SURFACE OF FRONT PANEL
3p POCKET PORTION
3s STEPPED WALL
3t VERTICAL WALL
5 COMPACT DISC (CD)
5h central hole
8 TURN TABLE
8b CENTRAL BOSS PORTION
30 SLIDE DOOR
30k INNER WALL OF SLIDE DOOR
53 DRIVEN PULLEY (ROTARY ELEMENT)
53c CYLINDRICAL PORTION
53d SMALL DIAMETER PORTION
53e TIP PORTION OF CYLINDRICAL PORTION
53f HOOK PORTION
53k ENGAGING PORTION
53p THIN PLATE PORTION
53s HOOK STRUT PORTION
53t OVERHANG TIP PORTION
60 UNIT BASE (PEDESTAL)
B1 BOSS PORTION (HOLLOW SHAFT)
B1d HOLLOW PORTION
B1e ABUTMENT RECEIVING PORTION
B1k STEPPED PORTION
B1s SMALL DIAMETER PORTION
Dc GAP
Sd RANGE
U1 CD REPRODUCTION UNIT (DISC APPARATUS)

The invention claimed is:

1. A rotary element assembly structure in which a rotary element is assembled to a tip side of a hollow shaft provided upright on a pedestal so that the rotary element is capable of rotating about the hollow shaft,
wherein the rotary element is provided with, at its rotation center portion, a cylindrical portion having an inner circumferential portion fitted with an outer circumferential portion of the hollow shaft;
the cylindrical portion is provided with, in its inside, a hook strut portion having a hook portion overhanging in a radial direction on its tip side and extending substantially along a fitting direction to the hollow shaft; and
a base end portion of the hook strut portion and a base end portion of the cylindrical portion are coupled to each other by a resin-made thin plate portion,
wherein the hollow shaft is provided with, at its tip side, a small diameter portion smaller in diameter than a hollow portion of the hollow shaft;
a radius of an overhang tip portion of the hook portion is set to be greater than a radius of the small diameter portion of the hollow shaft and to be smaller than a radius of the hollow portion, and
when the rotary element is assembled to the tip side of the hollow shaft, the cylindrical portion of the rotary element is fitted with the hollow shaft, whereby the hook portion on the tip side of the hook strut portion is pushed into the hollow portion via the small diameter portion on the tip side of the hollow shaft, and the hook portion engages with a stepped portion formed by the hollow portion and the small diameter portion.

2. The rotary element assembly structure according to claim 1, wherein the stepped portion is set such that its inner circumferential side is positioned toward the fitting direction of the cylindrical portion of the rotary element to the hollow shaft than its outer circumferential side is.

3. The rotary element assembly structure according to claim 2, wherein an engaging portion of the hook portion for the stepped portion is set such that its inner side is positioned toward the fitting direction than its outer side is.

4. The rotary element assembly structure according to claim 3, wherein
the outer circumferential portion of the hollow shaft is provided with an abutment receiving portion for stopping and receiving a tip portion of the cylindrical portion when the cylindrical portion of the rotary element is fitted, and
when the rotary element is fitted to the tip side of the hollow shaft, in a state where the tip portion of the cylindrical portion is stopped and received on the abutment receiving portion, a gap exists between a tip portion of the hollow shaft and the thin plate portion.

5. The rotary element assembly structure according to claim 4, wherein an outer circumferential portion on the tip side of the hollow shaft is provided with a small diameter portion having its outer diameter set to be small by a prescribed amount, the small diameter portion extending across a range from a tip of the outer circumferential portion to a site corresponding to a portion positioned closest to the fitting direction in the engaging portion of the hook portion for the stepped portion when the rotary element is assembled.

6. The rotary element assembly structure according to claim 3, wherein an outer circumferential portion on the tip side of the hollow shaft is provided with a small diameter portion having its outer diameter set to be small by a prescribed amount, the small diameter portion extending across a range from a tip of the outer circumferential portion to a site corresponding to a portion positioned closest to the fitting direction in the engaging portion of the hook portion for the stepped portion when the rotary element is assembled.

7. The rotary element assembly structure according to claim 2, wherein
the outer circumferential portion of the hollow shaft is provided with an abutment receiving portion for stopping and receiving a tip portion of the cylindrical portion when the cylindrical portion of the rotary element is fitted, and
when the rotary element is fitted to the tip side of the hollow shaft, in a state where the tip portion of the cylindrical portion is stopped and received on the abutment receiving portion, a gap exists between a tip portion of the hollow shaft and the thin plate portion.

8. The rotary element assembly structure according to claim 7, wherein an outer circumferential portion on the tip side of the hollow shaft is provided with a small diameter portion having its outer diameter set to be small by a prescribed amount, the small diameter portion extending across a range from a tip of the outer circumferential portion to a site corresponding to a portion positioned closest to the fitting direction in the engaging portion of the hook portion for the stepped portion when the rotary element is assembled.

9. The rotary element assembly structure according to claim 2, wherein an outer circumferential portion on the tip side of the hollow shaft is provided with a small diameter portion having its outer diameter set to be small by a prescribed amount, the small diameter portion extending across a range from a tip of the outer circumferential portion to a site corresponding to a portion positioned closest to the fitting direction in the engaging portion of the hook portion for the stepped portion when the rotary element is assembled.

10. The rotary element assembly structure according to claim 1, wherein an engaging portion of the hook portion for the stepped portion is set such that its inner side is positioned toward the fitting direction than its outer side is.

11. The rotary element assembly structure according to claim 10, wherein the outer circumferential portion of the hollow shaft is provided with an abutment receiving portion for stopping and receiving a tip portion of the cylindrical portion when the cylindrical portion of the rotary element is fitted, and when the rotary element is fitted to the tip side of the hollow shaft, in a state where the tip portion of the cylindrical portion is stopped and received on the abutment receiving portion, a gap exists between a tip portion of the hollow shaft and the thin plate portion.

12. The rotary element assembly structure according to claim 11, wherein an outer circumferential portion on the tip side of the hollow shaft is provided with a small diameter portion having its outer diameter set to be small by a prescribed amount, the small diameter portion extending across a range from a tip of the outer circumferential portion to a site corresponding to a portion positioned closest to the fitting direction in the engaging portion of the hook portion for the stepped portion when the rotary element is assembled.

13. The rotary element assembly structure according to claim 10, wherein an outer circumferential portion on the tip side of the hollow shaft is provided with a small diameter portion having its outer diameter set to be small by a prescribed amount, the small diameter portion extending across a range from a tip of the outer circumferential portion to a site corresponding to a portion positioned closest to the fitting direction in the engaging portion of the hook portion for the stepped portion when the rotary element is assembled.

14. The rotary element assembly structure according to claim 1, wherein the outer circumferential portion of the hollow shaft is provided with an abutment receiving portion for stopping and receiving a tip portion of the cylindrical portion when the cylindrical portion of the rotary element is fitted, and when the rotary element is fitted to the tip side of the hollow shaft, in a state where the tip portion of the cylindrical portion is stopped and received on the abutment receiving portion, a gap exists between a tip portion of the hollow shaft and the thin plate portion.

15. The rotary element assembly structure according to claim 1, wherein an outer circumferential portion on the tip side of the hollow shaft is provided with a small diameter portion having its outer diameter set to be small by a prescribed amount, the small diameter portion extending across a range from a tip of the outer circumferential portion to a site corresponding to a portion positioned closest to the fitting direction in the engaging portion of the hook portion for the stepped portion when the rotary element is assembled.

* * * * *